US011758523B2

(12) United States Patent
Abedini et al.

(10) Patent No.: US 11,758,523 B2
(45) Date of Patent: Sep. 12, 2023

(54) SUPPORT OF IAB OPERATION IN PAIRED SPECTRUM

(71) Applicant: QUALCOMM Incorporated, San Diego, CA (US)

(72) Inventors: Navid Abedini, Basking Ridge, NJ (US); Luca Blessent, Whitehouse Station, NJ (US); Jianghong Luo, Skillman, NJ (US); Karl Georg Hampel, Hoboken, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 17/225,909

(22) Filed: Apr. 8, 2021

(65) Prior Publication Data

US 2021/0321397 A1    Oct. 14, 2021

Related U.S. Application Data

(60) Provisional application No. 63/008,636, filed on Apr. 10, 2020.

(51) Int. Cl.
*H04W 72/04*     (2023.01)
*H04W 72/0446*   (2023.01)
(Continued)

(52) U.S. Cl.
CPC ....... *H04W 72/0446* (2013.01); *H04W 16/14* (2013.01); *H04W 72/23* (2023.01)

(58) Field of Classification Search
CPC .............. H04B 7/15542; H04W 16/14; H04W 72/042; H04W 72/0446; H04W 72/1289
(Continued)

(56) References Cited

U.S. PATENT DOCUMENTS

2020/0229181 A1* 7/2020 Qi .......................... H04W 16/26
2020/0305128 A1* 9/2020 Abedini .............. H04W 72/042
(Continued)

FOREIGN PATENT DOCUMENTS

EP         3648529 A1      5/2020
WO    WO-2020032580 A1    2/2020

OTHER PUBLICATIONS

"3rd Generation Partnership Project; Technical Specification Group Radio Access Network, NR and NG-RAN Overall Description, Stage 2 (Release 16)", 3GPP Standard, Technical Specification, 3GPP TS 38.300, 3rd Generation Partnership Project (3GPP), Mobile Competence Centre, 650, Route Des Lucioles, F-06921, Sophia-Antipolis Cedex, France, vol. RAN WG2, No. V16.1.0, Apr. 8, 2020 (Apr. 8, 2020), pp. 1-133, XP051893891, Retrieved from the Internet: URL: http://ftp.3gpp.org/Specs/archive/38_series/38.300/38300-g10.zip [retrieved on Apr. 8, 2020], the whole document.
(Continued)

*Primary Examiner* — Robert J Lopata
(74) *Attorney, Agent, or Firm* — Sevan Savsa; Loza & Loza LLP

(57) ABSTRACT

Aspects relate to an integrated access backhaul (IAB)-Distributed Unit (DU) resource configuration framework for paired (e.g., frequency division duplex (FDD)) spectrum. Two DU resource configurations per cell may be supported for paired spectrum, including one for a first spectrum band (e.g., a downlink frequency band) and another for a second spectrum band (e.g., an uplink frequency band) of the paired spectrum. Each DU resource configuration may include a respective symbol pattern of symbol types (e.g., downlink (DL), uplink (UL), flexible) for a plurality of slots, as well as a corresponding availability attribute for each symbol type (e.g., hard, soft, or not available). A DU of an IAB node in an IAB network may receive the two DU resource
(Continued)

configurations for the paired spectrum from a central unit (CU) of an IAB donor node in the IAB network.

28 Claims, 13 Drawing Sheets

(51) Int. Cl.
 *H04W 16/14* (2009.01)
 *H04W 72/23* (2023.01)
(58) Field of Classification Search
 USPC .......................................................... 370/329
 See application file for complete search history.

(56) References Cited

U.S. PATENT DOCUMENTS

| | | | | |
|---|---|---|---|---|
| 2021/0051768 | A1* | 2/2021 | Li | H04W 72/1257 |
| 2021/0410058 | A1* | 12/2021 | Dey | H04L 5/1438 |
| 2022/0239449 | A1* | 7/2022 | Luo | H04L 5/0094 |

OTHER PUBLICATIONS

AT&T: "Summary #3 of 7.2.3.1—Mechanisms for Resource Multiplexing Among Backhaul and Access Links", 3GPP Draft, 3GPP TSG RAN WG1 #99, R1-1913503, 3rd Generation Partnership Project (3GPP), Mobile Competence Centre, 650, Route Des Lucioles, F-06921, Sophia-Antipolis Cedex, France, vol. RAN WG1. No. Reno. USA, Nov. 18, 2019-Nov. 22, 219, Nov. 25, 2019 (Nov. 25, 2019), XP051830781, 17 pages, Retrieved from the Internet: URL: https://ftp.3gpp.org/tsg_ran/WG1_RL1/TSGR1_99/Docs/R1-1913503.zip [retrieved on Nov. 25, 2019) Section 2.2.

International Search Report and Written Opinion—PCT/US2021/026638—ISA/EPO—dated Jul. 29 2021.

MCC Support: "Final Report of 3GPP TSG RAN WG1 #99 v1.0.0 (Reno, USA, Nov. 18-22, 2019)", 3GPP Draft, 3GPP TSG RAN WG1 Meeting #100-e, R1-2000151, Final_Minutes_Report_RAN1#99_V100, 3rd Generation Partnership Project (3GPP), Mobile Competence Centre, 650, Route Des Lucioles, F-06921, Sophia-Antipolis Cedex, France, vol. RAN WG1, No. e-Meeting, Feb. 24, 2020-Mar. 6, 2020, Feb. 22, 2020 (Feb. 22, 2020), XP051852779, 163 pages, Retrieved from the Internet: URL: https://ftp.3gpp.org/tsg_ran/WG1_RL1/TSGR1_99/Report/Final_Minutes_report_RAN1%2399_v100.zip [retrieved on Feb. 22, 2020], p. 65, line 34-p. 66, line 5.

Qualcomm Incorporated: "Remaining Issues on IAB Resource Management", 3GPP Draft, 3GPP TSG RAN WG1 Meeting #99, R1-1912943, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 18, 2019-Nov. 22, 2019, Nov. 9, 2019 (Nov. 9, 2019), XP051823706, 9 pages, Retrieved from the Internet: URL: https://ftp.3gpp.org/tsg_ran/WG1_RL1/TSGR1_99/Docs/R1-1912943.zip [retrieved on Nov. 9, 2019] p. 4, line 30-p. 5, line 20.

* cited by examiner

SUPPORT OF IAB OPERATION IN PAIRED SPECTRUM

CROSS-REFERENCE TO RELATED APPLICATIONS

The present application for patent claims priority to and the benefit of U.S. Provisional Application No. 63/008,636, filed Apr. 10, 2020, and assigned to the assignee hereof and hereby expressly incorporated by reference herein as if fully set forth below in its entirety and for all applicable purposes.

TECHNICAL FIELD

The technology discussed below relates generally to wireless communication systems, and more particularly, to techniques for supporting paired spectrum in integrated access backhaul (IAB) networks.

Introduction

In 5G New Radio wireless communication networks, resources may be shared between access networks and backhaul networks. For example, the wireless spectrum may be used for both access links (e.g., links between base stations and user equipment (UEs)) and backhaul links (e.g., links between base stations and the core network). In such integrated access backhaul (IAB) networks, the shared wireless carrier may be time-divided into a plurality of frames, subframes, and slots. In some IAB network configurations, one or more slots may be allocated for access communication, while other slots may be allocated for backhaul communication. In addition, the wireless carrier may be a time division duplex (TDD) carrier in which transmissions in different directions are separated from one another using time division multiplexing or a frequency division duplex (FDD) carrier in which transmissions in different directions are separated from one another using frequency division multiplexing. For example, an FDD carrier may include paired spectrum, in which one spectrum band (e.g., one frequency band) may be utilized for transmissions in one direction, while another spectrum band (e.g., another frequency band) may be utilized for transmissions in the other direction.

An IAB network may include a plurality of IAB nodes, each of which may be an access point, base station (BS), or other node that utilizes the same wireless spectrum (e.g., the radio frequency (RF) spectrum) to support access for one or more UEs located within the cells served by the IAB nodes and to backhaul the access traffic to/from a mobile backhaul network or mobile core network, such as a fifth generation (5G) core network. Within an IAB network, one of the IAB nodes may be an IAB donor node that includes functionality for controlling the IAB network. For example, the IAB donor node may include a central unit (CU) configured to operate as a centralized network node (or central entity) within the IAB network. Each IAB node, including the IAB donor node, may further include a distributed unit (DU) that is configured to schedule communications with child nodes, such as other child IAB nodes and UEs, of the IAB node. Each child IAB node may further include a mobile termination (MT) unit configured to backhaul access traffic to/from a parent IAB node. The DU at the parent IAB node schedules the backhaul downstream and upstream access traffic to/from the MT unit at the child IAB node.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication at an integrated access backhaul (IAB) node within an IAB network. The method includes receiving a resource configuration for a distributed unit (DU) of the IAB node. The resource configuration can include a first DU resource configuration for a first spectrum band of paired spectrum and a second DU resource configuration for a second spectrum band of the paired spectrum. The method further includes scheduling at least one communication with a child node of the IAB node utilizing the resource configuration.

Another example provides an integrated access backhaul (IAB) node configured for wireless communication. The IAB node includes a transceiver, a memory, and a processor coupled to the transceiver and the memory. The processor and the memory can be configured to receive a resource configuration for a distributed unit (DU) of the IAB node via the transceiver. The resource configuration can include a first DU resource configuration for a first spectrum band of paired spectrum and a second DU resource configuration for a second spectrum band of the paired spectrum. The processor and the memory can further be configured to schedule at least one communication with a child node of the IAB node utilizing the resource configuration.

Another example provides a method of wireless communication at an integrated access backhaul (IAB) donor node within an IAB network. The method includes generating a resource configuration for a distributed unit (DU) of an IAB node within the IAB network. The resource configuration can include a first DU resource configuration for a first spectrum band of paired spectrum and a second DU resource configuration for a second spectrum band of the paired spectrum. The method further includes transmitting the resource configuration to the DU of the IAB node.

Another example provides an integrated access backhaul (IAB) donor node configured for wireless communication. The IAB donor node includes a transceiver, a memory, and a processor coupled to the transceiver and the memory. The processor and the memory can be configured to generate a resource configuration for a distributed unit (DU) of an IAB node within the IAB network. The resource configuration can include a first DU resource configuration for a first spectrum band of paired spectrum and a second DU resource configuration for a second spectrum band of the paired spectrum. The processor and the memory can further be configured to transmit the resource configuration to the DU of the IAB node via the transceiver.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
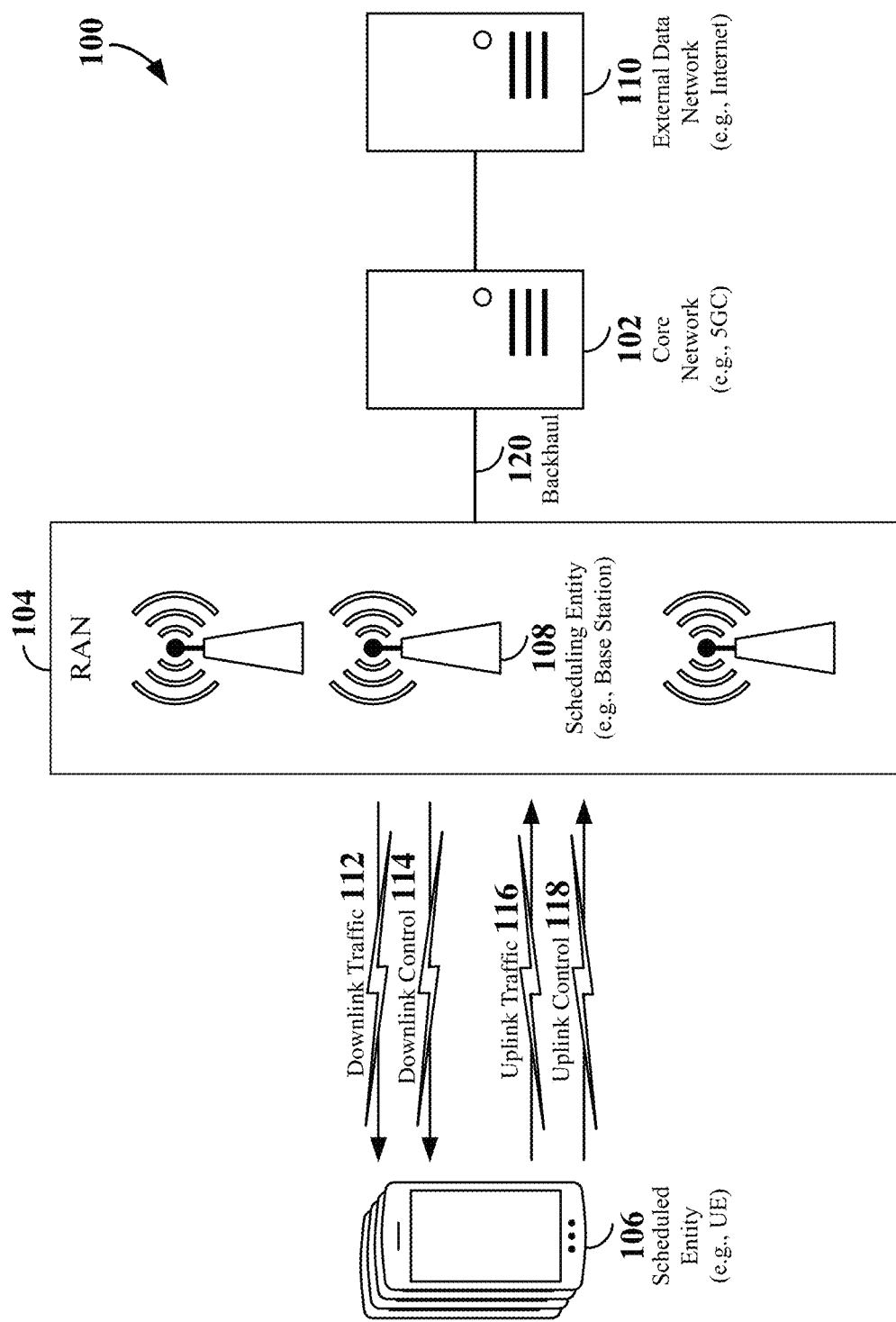
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects relate to an IAB-Distributed Unit (DU) resource configuration framework for paired spectrum to support a per-cell DU semi-static configuration for FDD carriers. Two semi-static DU resource configurations per cell may be supported for paired spectrum, including one for a first spectrum band (e.g., a downlink or downstream frequency band) and another for a second spectrum band (e.g., an uplink or upstream frequency band). Each DU resource configuration may include a respective symbol pattern of symbol types (e.g., downlink (DL), uplink (UL), flexible) per slot, as well as a corresponding availability attribute for each symbol type (e.g., hard, soft, or not available). For example, the uplink DU resource configuration may include a symbol pattern of uplink symbols and/or flexible symbols, whereas the downlink DU resource configuration may include a symbol pattern of downlink symbols and/or flexible symbols. For each symbol type in each of the DU resource configurations, the DU resource configuration may indicate whether that symbol type is a hard symbol type, a soft symbol type, or not available.

A CU of an IAB donor node may generate a resource configuration for a DU of an IAB node (which may be the DU of the IAB donor node) and transmit the resource configuration to the IAB node. For example, the resource configuration may be transmitted within an F1-Application Protocol (F1-AP) message from the CU. The resource configuration may include a first DU resource configuration for the first spectrum band of paired spectrum and a second DU resource configuration for the second spectrum band of the paired spectrum. The resource configuration may be transmitted, for example, within an information element containing a list of activated cells of the IAB node to be updated. Each cell in the list of activated cells may include a respective cell resource configuration for the paired spectrum. Thus, each cell resource configuration may include two DU resource configurations, one for uplink and one for downlink. In some examples, the CU of the IAB donor node may further transmit a respective child DU resource configuration for each child node (e.g., a child IAB node) of the IAB node (e.g., a parent IAB node), including a respective child DU resource configuration for each cell served by a child node. Each child DU resource configuration may also include two DU resource configurations, one for uplink and one for downlink in the paired spectrum.

In some examples, the soft symbols in each of the first DU resource configuration and/or the second DU resource configuration may be explicitly released by an IAB parent node to allow a child IAB-DU to configure the soft symbols for UL communication in the UL spectrum and/or DL communication in the DL spectrum. The parent IAB node may transmit a respective availability indicator for the soft symbols in each of the first and second DU resource configurations to the child IAB node. Each availability indicator may indicate the respective availability of the soft symbols in the first and second DU resource configurations for one or more slots. For example, the uplink and/or flexible symbols in the uplink DU resource configuration may be soft symbols, and the child IAB node may allocate one or more of the uplink and/or flexible symbols for UL communication upon receiving an uplink availability indicator from the parent IAB node indicating availability of the uplink and/or flexible soft symbols to the child IAB node. As another example, the downlink and/or flexible symbols in the downlink DU resource configuration may be soft symbols, and the child IAB node may allocate one or more of the downlink and/or flexible symbols for UL communication upon receiving a downlink availability indicator from the parent IAB node indicating availability of the downlink and/or flexible soft symbols to the child IAB node In some examples, the two availability indicators may be received within downlink control information (DCI), such as a DCI format 2_5.

In addition, guard symbols may be requested by a child IAB node and/or provided by a parent IAB node for transitions between DU mode and MT mode in the child IAB node (e.g., MT Tx/Rx to/from DU Tx/Rx). In slots having flexible symbols in the DU resource configuration of a child IAB node, a parent IAB node may treat a flexible resource (e.g., a flexible symbol) of a child IAB node in the UL portion of the FDD band as an UL resource and a flexible resource of the child IAB node in the DL portion of the FDD band as a DL resource for purposes of identifying a transition type between MT and DU in the child IAB node.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
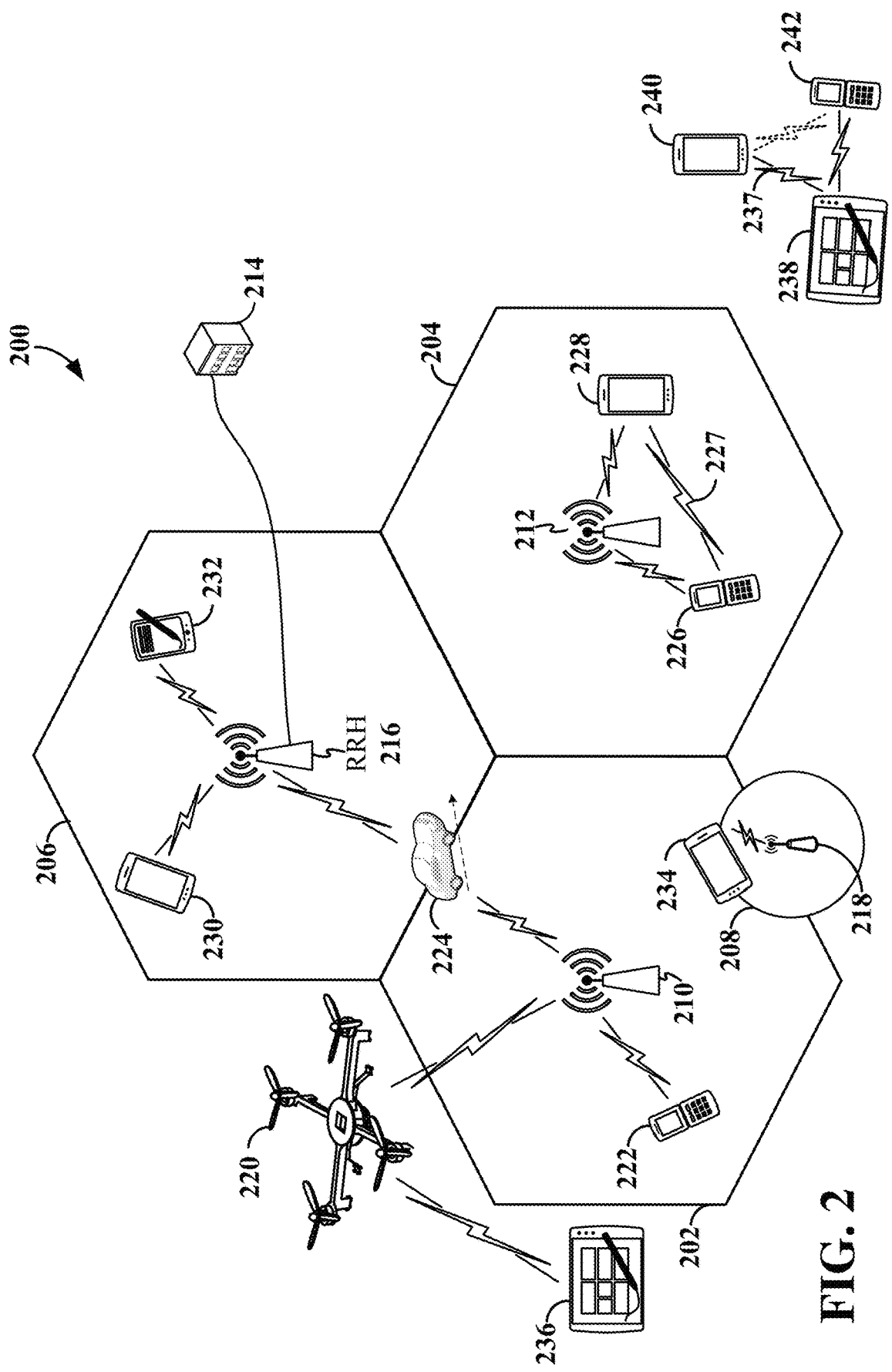
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a small cell, a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex or half-duplex FDD.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
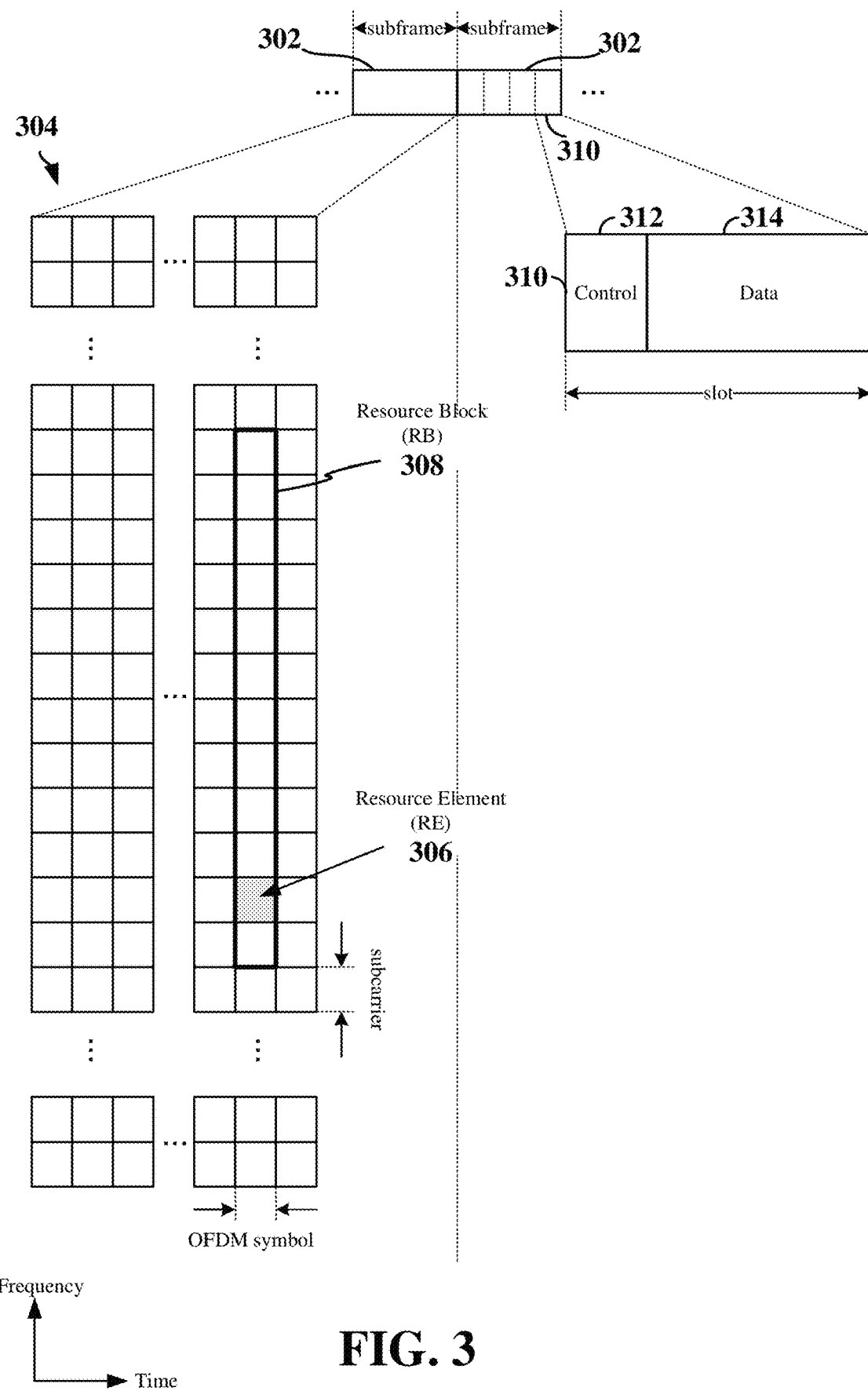
FIG. 3 is a schematic diagram illustrating organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS);

a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
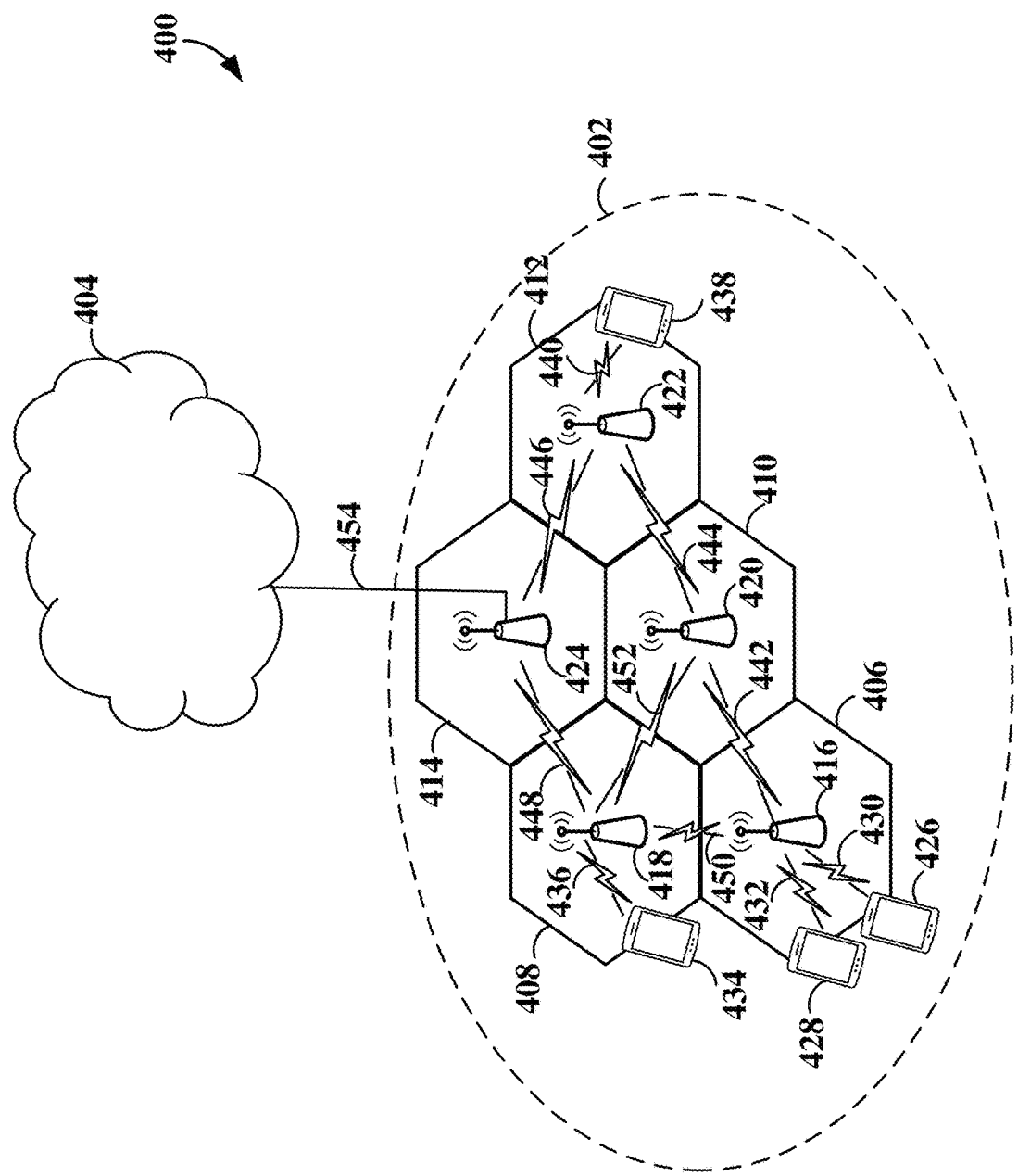
FIG. 4 is a diagram providing a high-level illustration of one example of a network configuration including an integrated access backhaul (IAB) network according to some aspects.

FIG. 4 is a schematic diagram providing a high-level illustration of one example of an integrated access backhaul (IAB) network configuration 400 that may be utilized in some aspects of the disclosure. In this illustration, a communication network 402, such as an IAB network, is coupled to a remote network 404, such as a main backhaul network or mobile core network. In such an IAB network 402, the wireless spectrum may be used for both access links and backhaul links. In some examples, the wireless spectrum may utilize millimeter-wave (mmWave) or sub-6 GHz carrier frequencies.

The IAB network 402 may be similar to the radio access network 200 shown in FIG. 2, in that the IAB network 402 may be divided into a number cells 406, 408, 410, 412, and 414, each of which may be served by a respective IAB node 416, 418, 420, 422, and 424. Each of the IAB nodes 416-424 may be an access point, base station (BS), eNB, gNB, or other node that utilizes wireless spectrum (e.g., the radio frequency (RF) spectrum) to support access for one or more UEs located within the cells 406-414 served by the IAB nodes.

In the example shown in FIG. 4, IAB node 416 communicates with UEs 426 and 428 via wireless access links 430 and 432, IAB node 418 communicates with UE 434 via wireless access link 436, and IAB node 422 communicates with UE 438 via wireless access link 440. The IAB nodes 416-424 are further interconnected via one or more wireless backhaul links 442, 444, 446, 448, 450, and 452. Each of the wireless backhaul links 442-452 may utilize the same wireless spectrum (e.g., the radio frequency (RF) spectrum) as the access links 430-440 to backhaul access traffic to/from the remote network 404. This may be referred to as wireless self-backhauling. Such wireless self-backhauling can enable fast and easy deployment of highly dense small cell networks. That is, rather than requiring each new gNB deployment to be outfitted with its own hard-wired backhaul connection, the wireless spectrum utilized for communication between the gNB and UE may be leveraged for backhaul communication between any numbers of IAB nodes to form the IAB network 402.

In the example shown in FIG. 4, IAB node 416 communicates with IAB node 420 via wireless backhaul link 442, IAB node 420 communicates with IAB node 422 via wireless backhaul link 444, IAB node 422 communicates with IAB node 424 via wireless backhaul link 446, IAB node 424 communicates with IAB node 418 via wireless backhaul link 448, IAB node 418 communicates with IAB node 416 via wireless backhaul link 450, and IAB node 418 communicates with IAB node 420 via wireless backhaul link 452. As shown in FIG. 4, each IAB node 416-424 may be connected via respective wireless backhaul links 442-452 to two or more other IAB nodes for robustness.

Some or all of the IAB nodes 416-424 may also be connected via wired backhaul links (e.g., fiber, coaxial cable, Ethernet, copper wires, etc.) and/or microwave backhaul links. Thus, the IAB network 402 may support both wired/microwave and wireless backhaul traffic. At least one of the IAB nodes (e.g., IAB node 424) may be a border IAB node, also referred to herein as an IAB donor node, that also provides a communication link 454 to the remote network 404. For example, the IAB donor node 424 may include a wired (e.g., fiber, coaxial cable, Ethernet, copper wires), microwave, or other suitable link 454 to the remote network 404.

To facilitate wireless communication between the IAB nodes 416-424 and between the IAB nodes 416-424 and the UEs served by the IAB nodes 416-424, each IAB node 416-424 may be configured to operate as both a scheduling entity and a scheduled entity. Thus, an IAB node (e.g., IAB node 416) may utilize the same wireless spectrum to transmit access traffic to/from UEs and to then backhaul that access traffic to/from the remote network 404. For example, to backhaul access traffic to/from IAB node 418, IAB node 418 may communicate with IAB node 420 to transmit backhaul access traffic via wireless backhaul link 442, IAB node 420 may communicate with IAB node 422 to transmit the backhaul access traffic via wireless backhaul link 444, and IAB node 422 may communicate with IAB node 424 to transmit the backhaul access traffic via wireless backhaul link 446. In this example, IAB nodes 420 and 422 may each operate as both a scheduling entity and a scheduled entity to backhaul access traffic to/from IAB node 416. As such, communication between a pair of IAB nodes may be individually scheduled by one of the IAB nodes within the pair.

In other examples, an IAB node may schedule wireless backhaul communications between other pairs of IAB nodes. For example, IAB node 424 may operate as the scheduling entity for the IAB network 402, while IAB nodes 416, 420, and 422 each operate as a scheduled entity to backhaul access traffic to/from IAB node 416. In this example, IAB node 424 may schedule wireless backhaul communications between each of the pairs of IAB nodes (e.g., between IAB node 416 and IAB node 420, between IAB node 420 and IAB node 422, and between IAB node 422 and IAB node 424). As another example, IAB node 422 may operate as a scheduling entity to schedule wireless backhaul communications between IAB nodes 416 and 420 and also between IAB node 420 and IAB node 422. IAB node 422 may then operate as a scheduled entity to allow IAB node 424 to schedule wireless backhaul communications therebetween.

Figure 5:
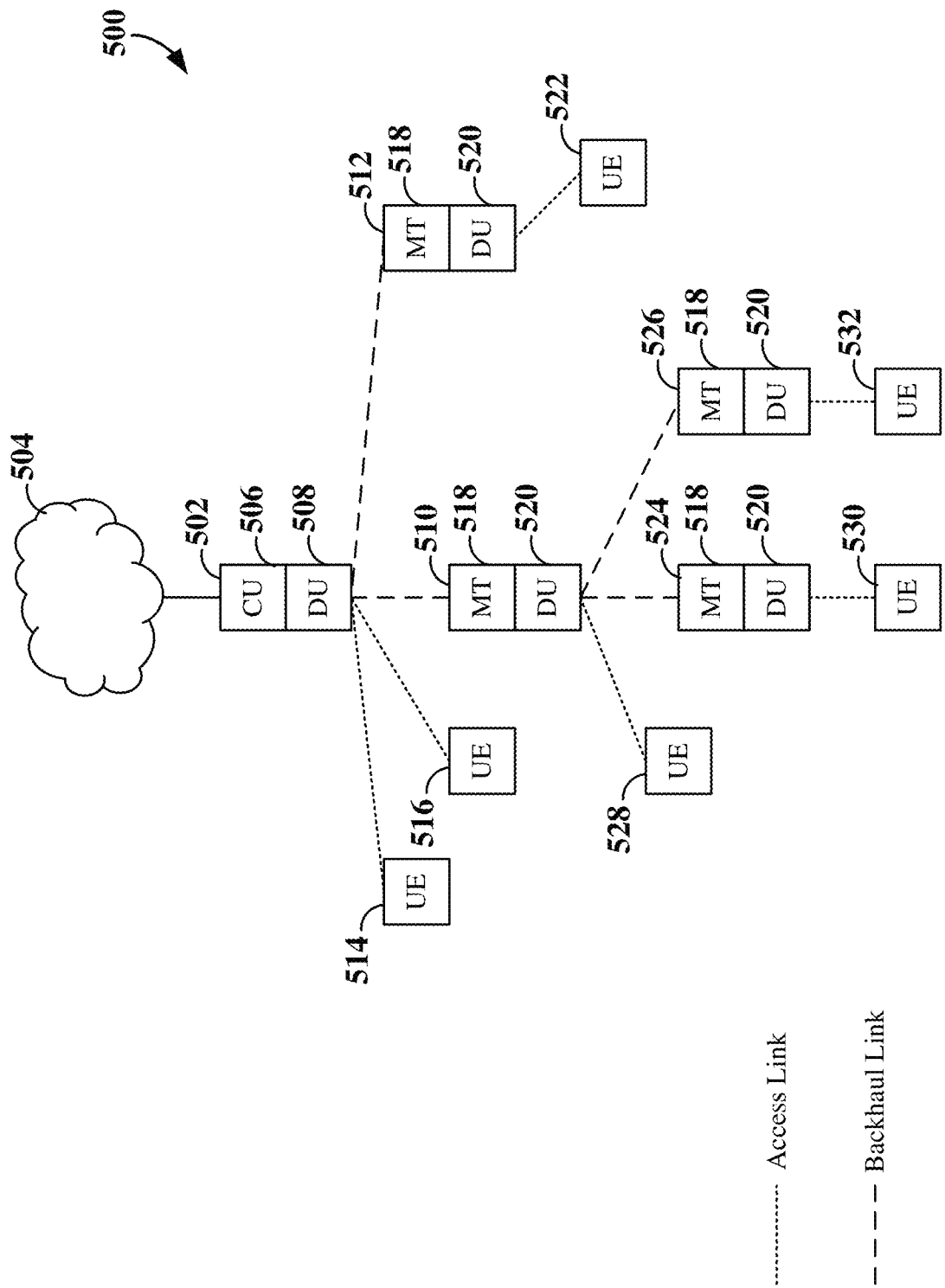
FIG. 5 is a diagram illustrating an example of IAB node functionality within an IAB network according to some aspects.

FIG. 5 is a schematic diagram illustrating an example of IAB node functionality within an IAB network 500. In the example shown in FIG. 5, an IAB node 502 is shown coupled to a core network 504 via a wireline connection. This IAB node 502 may be referred to herein as an IAB donor node, which may be, for example, an enhanced gNB including functionality for controlling the IAB network 500. In some examples, the IAB donor node 502 may include a central unit (CU) 506 and a distributed unit (DU) 508. The CU 506 is configured to operate as a centralized network node (or central entity) within the IAB network 500. For example, the CU 506 may include radio resource control (RRC) layer functionality and packet data convergence protocol (PDCP) layer functionality to control/configure the other nodes (e.g., IAB nodes and UEs) within the IAB network 500 via an F1 interface.

The DU 508 is configured to operate as a scheduling entity to schedule scheduled entities (e.g., other IAB nodes and UEs) of the IAB donor node 502. For example, the DU 508 of the IAB donor node 502 may operate as a scheduling entity to schedule IAB nodes 510 and 512 and UEs 514 and 516. Thus, the DU 508 of the IAB donor node 502 may schedule communication with IAB nodes 510 and 512 via respective backhaul links and schedule communication with UEs 514 and 516 via respective access links. In some examples, the DU 508 may include the radio link control (RLC), medium access control (MAC), and physical (PHY) layer functionality to enable operation as a scheduling entity.

Each of the IAB nodes 510 and 512 may be configured as a Layer 2 (L2) relay node including a respective DU 520 and a mobile termination (MT) unit 518 to enable each L2 relay IAB node 510 and 512 to operate as a scheduling entity and a scheduled entity. For example, the MT unit 518 within each of the L2 relay IAB nodes 510 and 512 is configured to operate as a scheduled entity that may be scheduled by the IAB donor node 502. Each MT unit 518 within the L2 relay IAB nodes 510 and 512 further facilitates communication with the IAB donor node 502 via respective backhaul links. In addition, the DU 520 within each of the L2 relay IAB nodes 510 and 512 operates similar to the DU 508 within the IAB donor node 502 to function as a scheduling entity to schedule one or more respective scheduled entities (e.g., other IAB nodes and/or UEs) of the L2 relay IAB nodes 510 and 512.

For example, the DU 520 of L2 relay IAB node 512 functions as a scheduling entity to schedule communication with a UE 522 via an access link, while the DU 520 of L2 relay IAB node 510 functions as a scheduling entity to schedule communication with the MT units 518 of L2 relay IAB nodes 526 and 526 via respective backhaul links and a UE 528 via an access link. Each of the L2 relay IAB nodes 524 and 526 further includes a respective DU 520 that functions as a scheduling entity to communicate with respective UEs 530 and 532. Thus, in the network topology illustrated in FIG. 5, since IAB donor node 502 is configured to control each of the other nodes in the IAB network, the IAB donor node 502 is a parent IAB node of child IAB nodes 510, 512, 524 and 526. In addition, IAB node 510 is further a parent IAB node of child IAB nodes 524 and 526. For example, the CU 506 and DU 508 within IAB donor node 502 may function as the parent IAB node of child IAB nodes 510, 512, 524, and 526 and the DU 520 within IAB node 510 may function as the parent IAB node of child IAB nodes 524 and 526. The MT unit 518 within IAB nodes 510, 512, 524, and 526 may further function as child IAB nodes.

Figure 6:
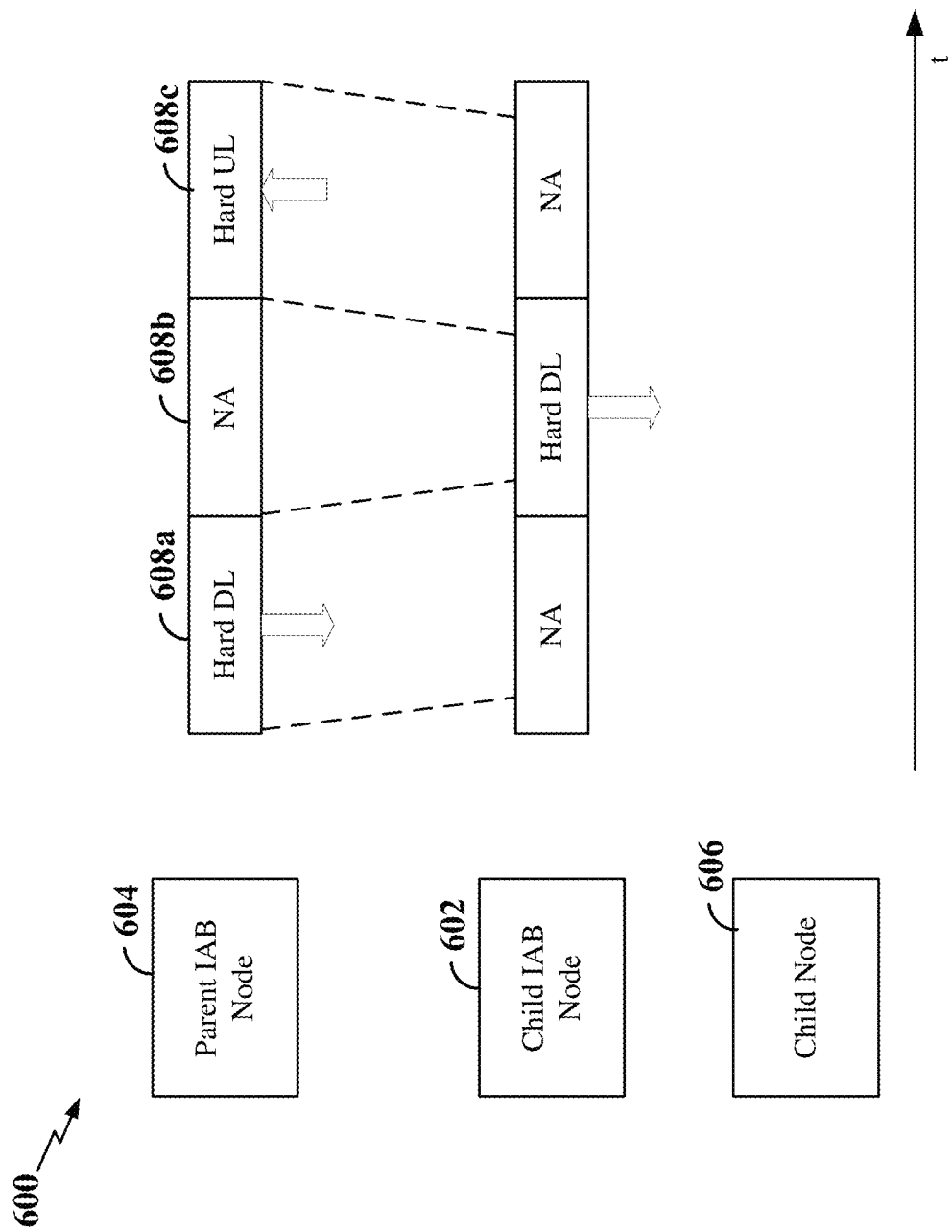
FIG. 6 is a diagram illustrating resource allocation in an IAB network according to some aspects.

FIG. 6 is a diagram illustrating resource allocation in an IAB network 600 according to some aspects. In the example shown in FIG. 6, a parent IAB node 604 is in wireless communication with a child IAB node 602 via a first (e.g., backhaul) link. The child IAB node 602 is further in wireless communication with a child node 606 (e.g., another IAB node or UE) via a second (e.g., backhaul or access) link. Each IAB node 602 and 604 may correspond, for example, to any of the IAB nodes illustrated in FIG. 4 or 5.

The IAB network 600 may coordinate the allocation of resources between parent IAB nodes 604 and child IAB nodes 602 in a time division multiplexed configuration. For example, the IAB network 600 may utilize a time division duplex (TDD) wireless carrier (e.g., unpaired spectrum) in FR2 (or higher frequency band) that may be time-divided into a plurality of frames, subframes, and slots. Within a frame, subframe, or slot, for each IAB node DU, the IAB donor node CU (e.g., shown in FIG. 5) may allocate different types of resources in the time domain, such as hard downlink (DL) resources, hard uplink (UL) resources, soft DL resources, soft UL resources, or resources that are not available (NA). Hard DL and hard UL resources allocated to an IAB node DU are resources that the IAB node DU may utilize regardless of whether the IAB node includes a co-located MT unit. Soft DL and soft UL resources allocated to an IAB node DU are resources that the IAB node DU may share with a co-located MT unit, and therefore, may be utilized when not in use by the MT unit (e.g., based on scheduling by the parent IAB-DU). Not available (NA) resources are resources that the IAB node DU may not utilize except for cell-specific signals, such as the SSB, CSI-RS, physical random access channel (PRACH), and SR.

In the example shown in FIG. 6, resources are shown time-divided into three sets of resources 608a, 608b, and 608c. Each set of resources 608a, 608b, and 608c may correspond to a frame, subframe, slot, or portion of a frame, subframe, or slot. The first set of resources 608a is shown allocated to the parent IAB node DU 604 as a hard DL resource and to the child IAB node DU 602 as not available. The second set of resources 608b is shown allocated to the parent IAB node DU 604 as not available and to the child IAB node DU 602 as a hard DL resource. The third set of resources 608c is shown allocated to the parent IAB node DU 604 as a hard UL resource and to the child IAB node DU 602 as not available. Therefore, the parent IAB node DU 604 may use the first set of resources 608a to transmit downlink information (e.g., downlink control and/or data) to the MT unit of the child IAB node 602 via the first link. The second set of resources 608b may then be used by the child IAB node DU 602 to transmit downlink information (e.g., downlink control and/or data) to the child node 606 via the second link. The third set of resources 608c may then be used by the parent IAB node DU 604 to receive uplink information (e.g., uplink control and/or data) from the MT unit of the child IAB node 602 via the first link.

The IAB donor node CU may generate and transmit a respective per-cell DU resource configuration for the TDD carrier to each IAB-DU (including the DU of the IAB donor node). The DU resource configuration may be transmitted, for example, within an F1 Application Protocol (F1-AP) message over the F1 interface between the CU and the IAB-DUs. Each DU resource configuration may be, for example, a semi-static configuration, including a symbol pattern of UL symbols, DL symbols, and/or flexible symbols per slot, as well as the corresponding availability attribute (e.g., hard, soft, or NA) for each symbol type (e.g., UL, DL, and flexible). For example, the DU resource configuration for a cell served by the parent IAB node 604 may include a symbol pattern of DL symbols 608a, flexible symbols 608b, and UL symbols 608c. The DL symbols 608a and UL symbols 608b may each be configured as hard symbols, whereas the flexible symbols 608b may be configured as not available.

In some examples, the DU resource configuration for a cell may be included within an information element of the F1-AP message. For example, the F1-AP message may include an Activated Cells to be Updated List information element (IE) that includes a list of activated cells served by an IAB-DU (e.g., parent IAB node 604) for which an updated DU resource configuration is included in the F1-AP message. For each cell in the Activated Cells to be Updated List IE, the F1-AP message may further include an IAB-DU Cell Resource Configuration IE that includes the DU resource configuration for that cell. The F1-AP message may further include a Child-Node List IE that includes a list of child IAB nodes (e.g., child IAB node 602) of the IAB-DU (parent IAB node 604). For each child IAB node and each cell served by the child IAB node, the F1-AP message may further include a corresponding IAB-DU Cell Resource Configuration IE for the cell served by the child IAB node. The parent IAB node (e.g., parent IAB node 604) may utilize the DU resource configuration of the parent IAB node 604 and child IAB node 602 in scheduling communication (UL/DL) with the child IAB node 602.

In various aspects of the disclosure, the DU resource configuration framework for cells communicating over an unpaired (e.g., TDD) spectrum may be extended to cells communicating over a paired (e.g., FDD) spectrum in FR1 or FR2 (or other frequency band). In some examples, a half-duplex constraint between upstream and downstream links is applicable to IAB-DUs communicating over paired (e.g., FDD) spectrum. For example, on an uplink (UL) portion of an FDD band, the MT unit of a child IAB node may operate only in transmit mode, and a DU unit of a parent IAB node may operate only in receive mode. Similarly, on a downlink (DL) portion of the FDD band, the MT unit of the child IAB node may only operate in receive mode, and the DU unit of the parent IAB node may only operate in transmit mode. Therefore, in some examples, the DU resource configuration for an IAB node may follow the existing TDD resource configuration framework by adding a second instance of the existing DU resource configuration in the DU resource configuration information element when the corresponding cell operates in FDD spectrum.

Figure 7:
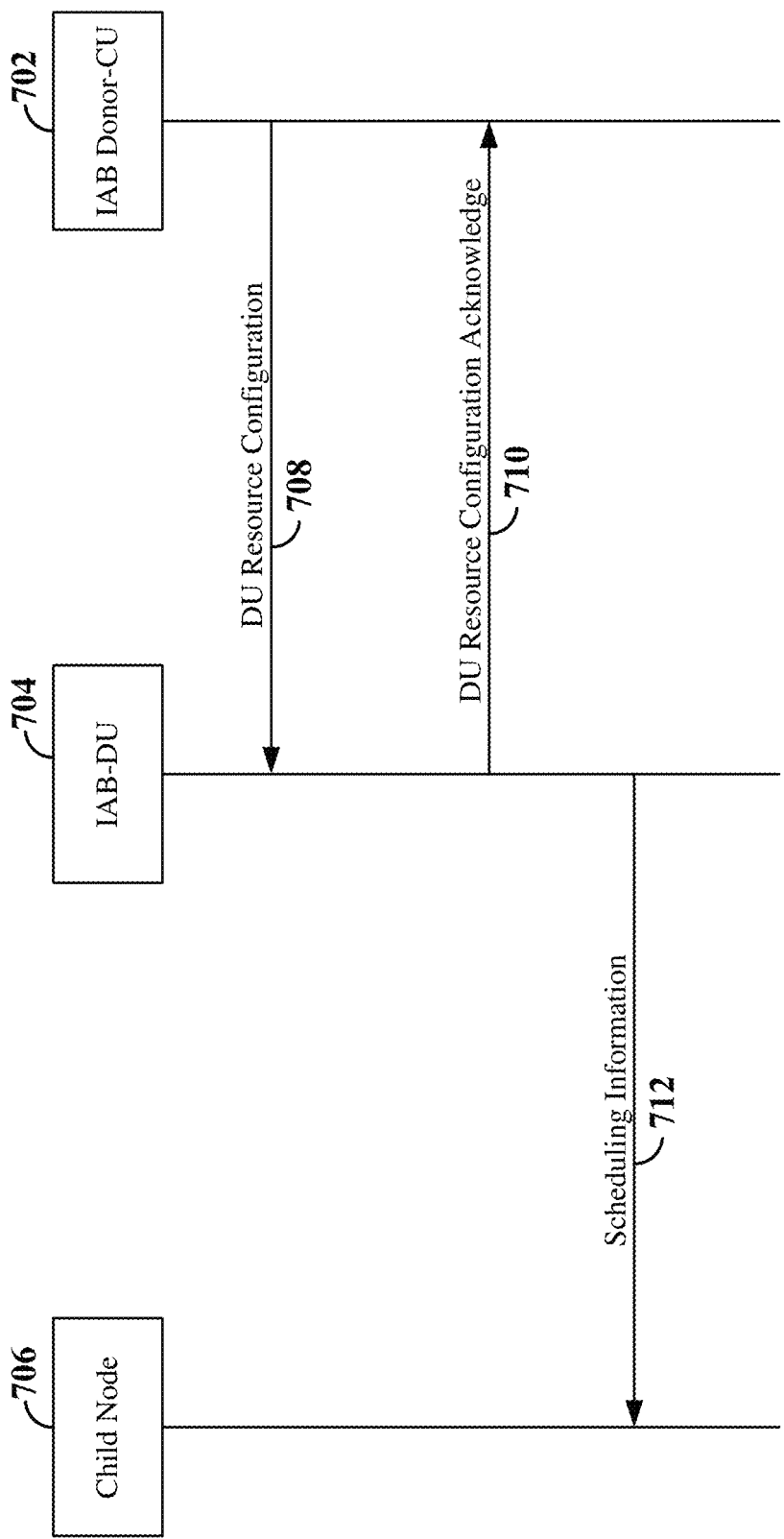
FIG. 7 is a signaling diagram illustrating exemplary signaling for distributed unit (DU) resource configuration in paired spectrum in an IAB network according to some aspects.

FIG. 7 is a signaling diagram illustrating exemplary signaling for distributed unit (DU) resource configuration in paired spectrum in an IAB network according to some aspects. In the example shown in FIG. 7, an IAB donor node 702 (e.g., a CU of an IAB donor node) is in wireless communication with an IAB node 704 (e.g., a DU of an IAB node, including a DU of an IAB donor node) over a backhaul link. The IAB-DU 704 may be a parent IAB node to one or more child nodes 706, one of which is shown for convenience. The IAB donor-CU 702 may correspond, for example, to any of the IAB donor nodes illustrated in FIGS. 4 and/or 5. The IAB-DU 704 may correspond, for example, to any of the IAB nodes illustrated in FIGS. 4 and/or 5. The child node 706 may correspond, for example, to any of the IAB child nodes, UEs, or other scheduled entities shown in FIGS. 1, 2, 4 and/or 5.

At 708, the IAB donor-CU 702 may generate a DU resource configuration in paired spectrum for the IAB-DU 704 and transmit the DU resource configuration to the IAB-DU 704. The DU resource configuration may include, for example, two semi-static DU resource configurations, each for a corresponding spectrum band (e.g., UL or DL portion) of the paired spectrum. For example, the DU resource configuration may include a first DU resource configuration for a first spectrum band of the paired spectrum and a second DU resource configuration for a second spectrum band of the paired spectrum. In some examples, the first DU resource configuration may include an uplink DU resource configuration for an uplink portion of the paired spectrum, whereas the second DU resource configuration may include a downlink DU resource configuration for a downlink portion of the paired spectrum.

In some examples, the uplink DU resource configuration includes an uplink symbol pattern for a plurality of uplink slots and the downlink DU resource configuration includes a downlink symbol pattern for a plurality of downlink slots. In some examples, the uplink symbol pattern includes a respective symbol type for each of a plurality of symbols in each uplink slot. For example, the symbol types for the uplink symbol pattern may include an uplink symbol type (U) or a flexible symbol type (F). Thus, the uplink symbol pattern includes a U/F pattern for the UL portion of the paired spectrum. In some examples, the downlink symbol pattern also includes a respective symbol type for each of a plurality of symbols in each downlink slot. For example, the symbol types for the downlink symbol pattern may include a downlink symbol type (D) or a flexible symbol type (F). Thus, the downlink symbol pattern includes a D/F pattern for the DL portion of the paired spectrum. Flexible symbols in the UL and/or DL resource configuration may provide operability with existing scheduling constraints. For example, there may be scheduling constraint that cancels periodic (semi-persistently scheduled) transmissions on flexible resources (e.g., for power saving purposes). Thus, configuring flexible resources on the paired spectrum may enable a paired spectrum cell to implement this scheduling constraint.

Each of the uplink and downlink DU resource configurations may further include a respective availability attribute (e.g., hard symbol attribute (H), soft symbol attribute (S), or not available attribute (NA)) for each symbol type. For example, the uplink DU resource configuration may include a respective availability attribute for each of the U and F symbol types. In addition, the downlink DU resource configuration may also include a respective availability attribute for each of the D and F symbol types. In this example, the H/S/NA granularity may be per spectrum band. Thus, the availability attribute (H/S/NA) for the U symbol type in the uplink DU resource configuration may be applied to all U symbols in the uplink DU resource configuration. Similarly, the availability attribute (H/S/NA) for the F symbol type in the uplink DU resource configuration may be applied to all F symbols in the uplink DU resource configuration. The different availability attribute options may provide flexibility in configuring resources in a shared paired spectrum (e.g., shared across multiple IAB-DUs serving neighbor cells and/or multiple neighbor cells of a single IAB-DU). For example, the IAB donor-CU 702 may configure a set of resources in the uplink portion of the paired spectrum as flexible NA resources for one IAB-DU (e.g., IAB-DU 704) and configure the same set of resources as uplink soft or hard resources to another IAB-DU.

In some examples, the DU resource configuration may include flexible slots (e.g., slots including all flexible symbols) or flexible symbols within slots that may be aligned across the DL and UL portions of the paired spectrum. In this example, the H/S/NA availability attribute for the flexible symbols may be applied across both spectrum bands (e.g., uplink and downlink portions) of the paired spectrum. Thus, a single common availability configuration for U/D/F symbols may be generated for both spectrum bands, thus obviating the need for duplication of the availability configuration between the uplink DU resource configuration and downlink DU resource configuration.

In some examples, in a given slot, flexible symbols (if any) may be configured in both the uplink DU resource configuration and downlink DU resource configuration or in only one of the uplink DU resource configuration or downlink DU resource configuration. Such configurations may support, for example, half-duplex FDD (HD-FDD). In examples in which flexible symbols may be configured in both the uplink DU resource configuration and downlink DU resource configuration for a given slot, the flexible symbols may be partially overlapping or not overlapping. In addition, in examples in which flexible symbols may be configured for only one of the downlink DU resource configuration or the uplink DU resource configuration, a single common availability configuration of the respective availability attributes of U/D/F symbols may be generated for both the uplink DU resource configuration and the downlink DU resource configuration.

In some examples, the DU resource configuration for paired spectrum may not include any flexible resources in one or both of the DL or UL portion of the paired spectrum. In this example, the TDD DU resource configuration may be optional. In addition, the H/S/NA granularity may be per slot in a particular spectrum band (e.g., frequency band) of the paired spectrum to provide sufficient flexibility in configuring the DU resources across cells and/or across IAB-DUs. In addition, a single common availability configuration of the respective availability attributes of U/D symbols may be generated for both the uplink DU resource configuration and the downlink DU resource configuration.

Other symbol patterns for DU resource configurations are also within the scope of the disclosure, including patterns that include both UL and DL symbols within a single spectrum band of the paired spectrum.

In some examples, the DU resource configuration may include a respective DU resource configuration for each cell served by the IAB-DU 704. Each DU resource configuration for each cell may include, for example, two semi-static DU resource configurations, one for each spectrum band of the paired spectrum.

In some examples, the IAB donor-CU 702 may transmit an F1-AP message including the DU resource configuration to the IAB-DU 704. In this example, the F1-AP message may include an information element (IE) including a list of activated cells of the IAB-DU to be updated. For example, the F1-AP message may include an Activated Cells to be Updated List IE that includes the list of activated cells served by the IAB-DU 704 for which an updated DU resource configuration is included in the F1-AP message. For each cell in the Activated Cells to be Updated List IE, the F1-AP message may further include an IAB-DU Cell Resource Configuration IE that includes a cell resource configuration for the paired spectrum (e.g., the DU resource configuration for each spectrum band in that cell). Thus, each cell resource configuration includes two DU resource configurations, one for each of the spectrum bands (e.g., uplink and downlink portions) of the paired spectrum.

The IAB donor-CU 702 may further transmit a respective child DU resource configuration for each child IAB node (e.g., child node 706) of the IAB-DU 704. Each child DU resource configuration may include two DU resource configurations of the child node 706, one for each spectrum band (e.g., uplink and downlink) of the paired spectrum. For example, the F1-AP message may further include a Child-Node List IE that includes a list of child IAB nodes (e.g., child node 706) of the IAB-DU 704. For each child IAB node and each cell served by the child IAB node, the F1-AP message may further include a corresponding IAB-DU Cell Resource Configuration IE for the cell served by the child IAB node. The IAB-DU Cell Resource Configuration IE may include two DU resource configurations (e.g., one for uplink and one for downlink) for the child IAB node cell.

At 710, the IAB-DU 704 may store the DU resource configuration, including any child IAB node DU resource configurations, received from the IAB donor-CU 702 and transmit a DU resource configuration acknowledge message to the IAB donor-CU 702. At 712, the IAB-DU 704 may utilize the DU resource configuration, including any DU resource configuration(s) of the child node 706, to schedule communication (UL/DL) with the child node 706. The IAB-DU 704 may then transmit scheduling information indicating a downlink assignment or uplink grant of resources on the paired spectrum for the child node 706 based on the DU resource configuration. For example, the IAB-DU 704 may schedule downlink transmissions to the child node 706 on hard DL resources in the downlink portion of the paired spectrum and uplink transmissions from the child node 706 on hard UL resources in the uplink portion of the paired spectrum.

As another example, the IAB-DU 704 may further schedule downlink transmissions on downlink or flexible soft resources in the downlink portion of the paired spectrum and uplink transmissions on uplink or flexible soft resources in the uplink portion of the paired spectrum based on the availability of the soft resources. In some examples, the IAB-DU 704 may determine the availability of the soft resources based on scheduling information received from a parent IAB node (not shown) of the IAB-DU 704. For example, the soft resources may be configured for both the IAB-DU 704 and the co-located MT unit of the IAB-DU 704. In this example, the IAB-DU 704 may utilize the soft resources for scheduling communication with the child node 706 in response to determining that the parent IAB node of the co-located MT unit of the IAB-DU 704 has not scheduled any communications with the MT unit on those soft resources.

In other examples, the parent IAB node of the IAB-DU 704 may transmit an availability indicator to the IAB-DU 704 that explicitly indicates a respective availability of one or more soft symbol types to the IAB-DU 704. For example, the availability indicator may indicate whether the soft uplink, soft downlink, and/or soft flexible symbols in one or more slots (e.g., the next N slots) are available to the IAB-DU 704 for scheduling. In TDD operations, a single availability indicator may be provided that indicates the respective availability of each of the symbol types (DL, UL, and flexible). The availability indicator may indicate, for example, that all soft symbol types are available for scheduling by the IAB-DU 704, that none of the soft symbol types are available for scheduling by the IAB-DU 704, or that one or more of the soft symbol types are available for scheduling by the IAB-DU 704.

Figure 8:
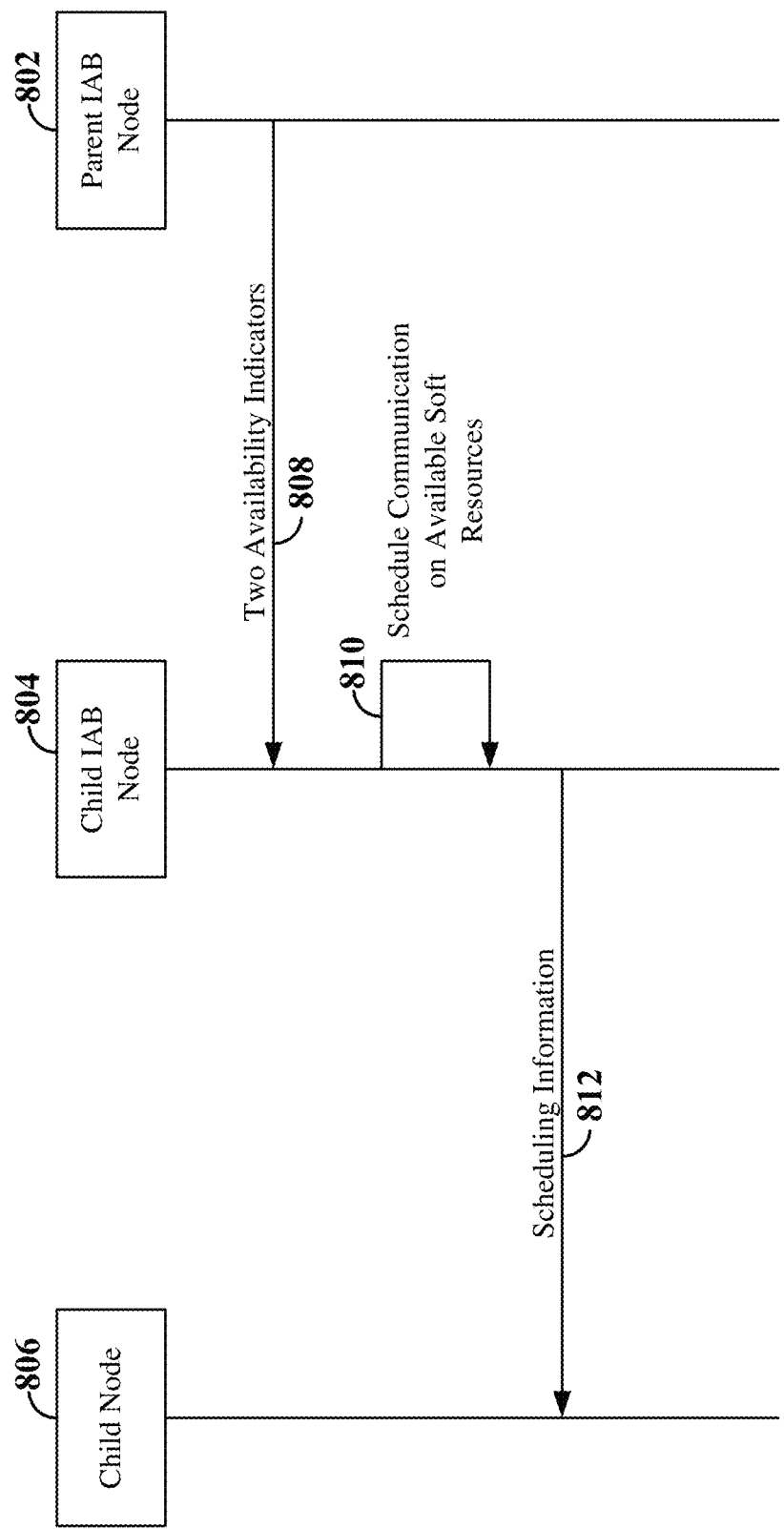
FIG. 8 is a signaling diagram illustrating exemplary signaling for scheduling communication on soft resources in paired spectrum according to some aspects.

For FDD operations, in accordance with aspects herein, two separate availability indicators may be transmitted from the IAB parent node to the IAB-DU 704 to enable additional flexibility in releasing soft resources between the two spectrum bands of the paired spectrum. FIG. 8 is a signaling diagram illustrating exemplary signaling for scheduling communication on soft resources in paired spectrum according to some aspects. In the example shown in FIG. 8, a parent IAB node 802 (e.g., a DU of an IAB node) is in wireless communication with a child IAB node 804 (e.g., a MT unit of an IAB node) over a backhaul link. The child IAB node 804 may further be in wireless communication with one or more child nodes 806, one of which is shown for convenience. The parent IAB node 802 and child IAB node 804 may each correspond, for example, to any of the IAB nodes illustrated in FIGS. 4-7. The child node 806 may correspond, for example, to any of the IAB child nodes, UEs, or other scheduled entities shown in FIGS. 1,2, and/or 4-7.

At 808, the parent IAB node 802 may generate and transmit two availability indicators to the child IAB node 804. Each availability indicator may be associated with a respective spectrum band (e.g., a respective DU configuration for a spectrum band) of paired spectrum. For example, a first availability indicator may be associated with a first spectrum band (e.g., an uplink spectrum band) of the paired spectrum and a second availability indicator may be associated with a second spectrum band (e.g., a downlink spectrum band) of the paired spectrum. The first availability indicator may indicate, for example, a respective availability of each symbol type in a first DU resource configuration (e.g., an uplink DU resource configuration) having the soft symbol attribute in one or more slots (e.g., the next N slots). The second availability indicator may indicate, for example, a respective availability of each symbol type in a second DU resource configuration (e.g., a downlink DU resource configuration) having the soft symbol attribute in one or more slots (e.g., the next N slots or a different number of slots than the first availability indicator).

The first availability indicator may indicate, for example, that all symbol types (e.g., U and F) having the soft symbol attribute are available for scheduling by the child IAB node 804, that none of the symbol types (e.g., U and F) having the soft symbol attribute are available for scheduling by the child IAB node 804, or that one of the symbol types (e.g., U or F) is available for scheduling by the child IAB node 804. The second availability indicator may indicate, for example, that all symbol types (e.g., D and F) having the soft symbol attribute are available for scheduling by the child IAB node 804, that none of the symbol types (e.g., D and F) having the soft symbol attribute are available for scheduling by the child IAB node 804, or that one of the symbol types (e.g., D or F) is available for scheduling by the child IAB node 804.

In some examples, the first and second availability indicators may be transmitted, for example, within downlink control information (DCI) from the parent IAB node 802 to the child IAB node 804. For example, the availability indicators may be carried within DCI format 2_5. Thus, in various aspects, DCI format 2_5 may be extended to include two availability indicators for paired spectrum. This extension may follow, for example, the same framework as utilized in DCI format 2_0 to extend the slot format indicator (SFI), which is carried in DCI format 2_0, to paired spectrum.

At 810, the child IAB node 804 may schedule communication with the child node 806 on available resources, including available soft resources as indicated by the two availability indicators. For example, the child IAB node 804 may schedule uplink communication from the child node 806 to the child IAB node 804 on hard uplink resources and on soft uplink and/or soft flexible resources indicated as being available by the first availability indicator. In addition, the child IAB node 804 may schedule downlink communication from the child IAB node 804 to the child node 806 on hard downlink resources and on soft downlink and/or soft flexible resources indicated as being available by the second availability indicator. At 812, the child IAB node 804 may generate and transmit scheduling information indicating the resources scheduled for uplink and/or downlink communication to the child node 806.

In some examples, the child IAB node 804 and parent IAB node 802 may further exchange information related to a number of guard symbols to be utilized at transitions between MT unit communication and DU communication. For example, referring again to FIG. 6, the child IAB node 602 may transition from the MT unit to the DU between the first set of resources 608a and the second set of resources 608b and then again transitions from the DU back to the MT unit between the second set of resources 608b and the third set of resources 608c. Each transition may involve the child IAB node 602 performing a hardware switch between transmitting and receiving and/or modifying an analog beam width utilized for transmission or reception. In addition, downlink transmissions from the parent IAB node 604 within the first set of resources 608a may be received at the child IAB node 602 during the second set of resources 608b as a result of the propagation delay between the parent IAB node 604 and the child IAB node 602. Furthermore, the child IAB node 602 may initiate uplink transmissions associated with the third set of resources 608c to the parent IAB node 604 within the second set of resources 608b based on a timing advance (TA) value provided by the parent IAB node 604 to the child IAB node 602.

To facilitate switching at the child IAB node 602 (e.g., between transmitting and receiving and/or analog beam width) and to further avoid or minimize resource overlap between MT unit transmissions/receptions and DU transmissions/receptions due to a TA or propagation latency, a gap may be provided at the edge (e.g., beginning or end) of the resources where a transition between the MT unit of the child IAB node 602 and the DU of the child IAB node 602 occurs. For example, a first gap may be provided at the transition between the first set of resources 608a and the second set of resources 608b and a second gap may be provided between the second set of resources 608b and the third set of resources 608c. Each gap may include one or more guard symbols (e.g., OFDM or SC-FDMA symbols) within a set of resources that are not utilized for transmission or reception. The child IAB node 602 may request and/or the parent IAB node 604 may provide a number of guard symbols at each of the transitions.

In the TDD bands, the number of guard symbols may be different at each transition type (e.g., MT Tx/Rx to/from DU Tx/Rx). Thus, a respective number of guard symbols may be specified for each of eight different transition types. For FDD bands, some of the transition types may not be relevant. For example, on the UL portion of the paired spectrum, the MT unit can only be in transmit (Tx) mode, and the DU can only be in receive (Rx) mode. Thus, the only transition types on the UL portion of the paired spectrum are MT Tx to/from Du Rx. In addition, on the DL portion of the paired spectrum, the MT unit can only be in Rx mode, and the DU can only be in Tx mode. Thus, the only transition types on the DL portion of the paired spectrum are MT Rx to/from Du Tx.

In the TDD bands, the transition type may not be easily identifiable at the parent IAB node 604 when flexible symbols are provided in the child DU resource configuration at the edge of a transition. However, for FDD bands, there may not be such ambiguity. For example, a flexible resource in the UL portion of the paired spectrum may only be changed to UL, and a flexible resource in the DL portion of the paired spectrum may only be changed to DL.

Thus, in various aspects, for FDD bands, the parent IAB node (e.g., parent IAB node 802 shown in FIG. 8) may consider flexible resources (flexible symbols) to be uplink symbols in the uplink symbol pattern of the uplink portion of the paired spectrum in selecting a number of guard symbols for a transition type between an MT operation and a DU operation of the child IAB node (e.g., child IAB node 804 shown in FIG. 8). In addition, the parent IAB node 802 may further consider flexible resources (flexible symbols) to be downlink symbols in the downlink symbol pattern of the downlink portion of the paired spectrum in selecting a number of guard symbols for a transition type between an MT operation and a DU operation of the child IAB node 804.

Figure 9:
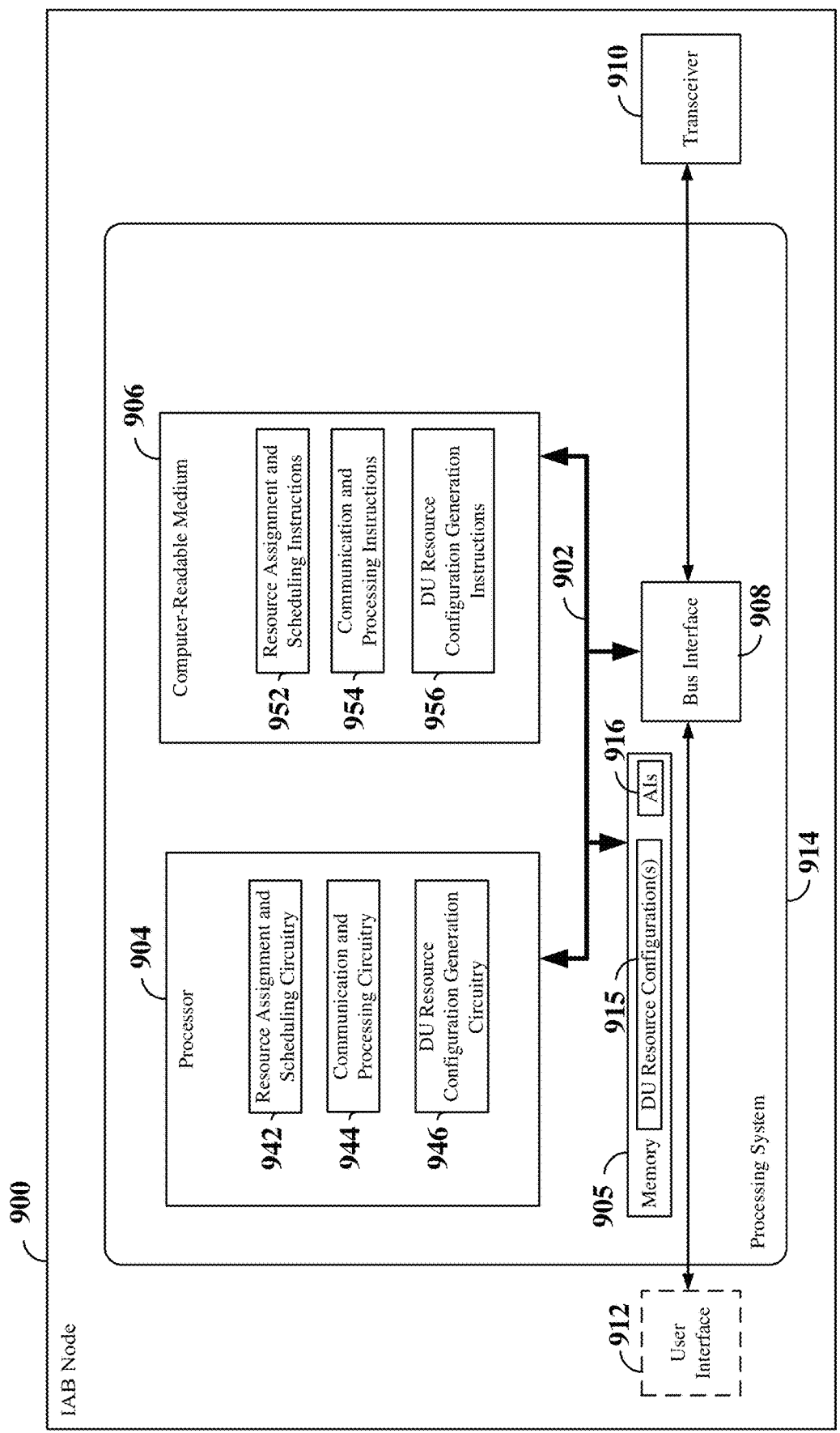
FIG. 9 is a block diagram illustrating an example of a hardware implementation for an IAB node employing a processing system according to some aspects.

FIG. 9 is a block diagram illustrating an example of a hardware implementation for an IAB node 900 employing a processing system 914. For example, the IAB node 900 may be a child IAB node, a parent IAB node, or an IAB donor node, as illustrated in any one or more of FIGS. 4-9.

The IAB node 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the IAB node 900 may be configured to perform any one or more of the functions described herein. That is, the processor 904, as utilized in a IAB node 900, may be used to implement any one or more of the processes and procedures described below.

The processor 904 may in some instances be implemented via a baseband or modem chip and in other implementations, the processor 904 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further.

A bus interface 908 provides an interface between the bus 902 and a transceiver 910. The transceiver 910 provides a communication interface or means for communicating with various other apparatus over a transmission medium (e.g., air). Depending upon the nature of the apparatus, a user interface 912 (e.g., keypad, display, touch screen, speaker, microphone, control knobs, etc.) may also be provided. Of course, such a user interface 912 is optional, and may be omitted in some examples.

The processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software. For example, the memory 905 may store DU resource configuration(s) 915 and availability indicators (AIs) 916 that may be used by the processor 904.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906.

The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. In some examples, the computer-readable medium 906 may be part of the memory 905. Those skilled in the art will recognize how best to implement the described functionality presented throughout this disclosure depending on the particular application and the overall design constraints imposed on the overall system.

In some aspects of the disclosure, the processor 904 may include circuitry configured for various functions. In examples in which the IAB node 900 includes an IAB-DU (e.g., the IAB node 900 is a child IAB node, a parent IAB node, or an IAB donor node), the processor 904 may include resource assignment and scheduling circuitry 942, configured to generate, schedule, and modify a resource assignment or grant of time-frequency resources (e.g., a set of one or more resource elements) to a set of one or more child nodes (e.g., UEs or child IAB nodes) of the IAB node 900. For example, the resource assignment and scheduling circuitry 942 may schedule time-frequency resources within a plurality of time division duplex (TDD) and/or frequency division duplex (FDD) slots to carry user data traffic and/or control information to and/or from the set of one or more child nodes (e.g., UEs or child IAB nodes).

In examples in which the IAB node 900 is an IAB donor node including a CU, the resource assignment and scheduling circuitry 942 may be configured to schedule resources for the transmission of a DU resource configuration 915 to another IAB node (e.g., the DU of the other IAB node) in the IAB network. For example, the resource assignment and scheduling circuitry 942 may be configured to schedule resources for the transmission of an F1-AP message including the DU resource configuration 915 to the other IAB node. In this example, the DU resource configuration 915 may include a first DU resource configuration for a first spectrum band (e.g., an uplink frequency band) of paired spectrum and a second DU resource configuration for a second spectrum band (e.g., a downlink spectrum band) of the paired spectrum when the other IAB node is operating in FDD bands. The DU resource configuration 915 may be associated with a single cell served by the other IAB node. In examples in which the other IAB node serves multiple cells, the F1-AP message may further include respective additional DU resource configurations 915 for each cell served by the other IAB node. In addition, the F1-AP message may further include additional DU resource configurations 915 (e.g., child DU resource configurations) for one or more child IAB nodes of the other IAB node.

In examples in which the IAB node 900 is a parent IAB node, the resource assignment and scheduling circuitry 942 may be configured to schedule resources for the transmission of AIs 916 to a child IAB node. The AIs 916 may include, for example, a first AI 916 for the first spectrum band (e.g., the uplink portion) of the paired spectrum and a second AI 916 for the second spectrum band (e.g., the downlink portion) of the paired spectrum. The AIs 916 may be transmitted, for example, within DCI. The DCI may, for example, have a DCI format 2_5.

The resource assignment and scheduling circuitry 942 may further be configured to schedule resources for communication (e.g., uplink or downlink communication) with one or more child nodes (e.g., UEs or child IAB nodes) using the DU resource configuration 915 associated with the cell serving the one or more child nodes. For example, the resource assignment and scheduling circuitry 942 may be configured to schedule uplink communication with the one or more child nodes using the uplink DU resource configuration in the DU resource configuration 915 for the uplink spectrum band of the paired spectrum. The resource assignment and scheduling circuitry 942 may further be configured to schedule downlink communication with the one or more child nodes using the downlink DU resource configuration in the DU resource configuration 915 for the downlink spectrum band of the paired spectrum. The resource assignment and scheduling circuitry 942 may further utilize the respective child DU resource configurations of child IAB nodes in scheduling communication with the child IAB nodes.

In addition, the resource assignment and scheduling circuitry 942 may further be configured to utilize the AIs 916 received from a parent IAB node of the IAB node 900 in scheduling the uplink and/or downlink communication with the one or more child nodes. For example, the resource assignment and scheduling circuitry 942 may be configured to schedule uplink communication on soft uplink or flexible symbols based on the AI 916 for the uplink spectrum band. The resource assignment and scheduling circuitry 942 may further be configured to schedule downlink communication on soft downlink or flexible symbols based on the AI 916 for the downlink spectrum band.

In some examples, the resource assignment and scheduling circuitry 942 may further consider flexible symbols in a child DU resource configuration to be uplink symbols in the uplink symbol pattern of the child IAB node or downlink symbols in the downlink symbol pattern of the child IAB node. The resource assignment and scheduling circuitry 942 may then select a number of guard symbols at a transition type between a MT unit operation and DU operation of the child IAB node based on considering the flexible symbols to be uplink symbols in the uplink symbol pattern or downlink symbols in the downlink symbol pattern. The resource assignment and scheduling circuitry 942 may further be configured to execute resource assignment and scheduling instructions (software) 952 included on the computer-readable medium 906 to implement one or more functions described herein.

The processor 904 may further include communication and processing circuitry 944, configured to communicate with other IAB nodes and/or UEs in the IAB network. In some examples, the communication and processing circuitry 944 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 944 may include one or more transmit/receive chains.

In some implementations where the communication involves receiving information, the communication and processing circuitry 944 may obtain information from a component of the wireless communication device 900 (e.g., from the transceiver 910 that receives the information via radio frequency signaling or some other type of signaling suitable for the applicable communication medium), process (e.g., decode) the information, and output the processed information. For example, the communication and processing circuitry 944 may output the information to another component of the processor 904, to the memory 905, or to the bus interface 908. In some examples, the communication and processing circuitry 944 may receive one or more of signals, messages, other information, or any combination thereof. In some examples, the communication and processing circuitry 944 may receive information via one or more channels. In some examples, the communication and processing circuitry 944 may include functionality for a means for receiving. In some examples, the communication and processing circuitry 944 may include functionality for a means for processing, including a means for demodulating, a means for decoding, etc.

In some implementations where the communication involves sending (e.g., transmitting) information, the communication and processing circuitry 944 may obtain information (e.g., from another component of the processor 904, the memory 905, or the bus interface 908), process (e.g., modulate, encode, etc.) the information, and output the processed information. For example, the communication and processing circuitry 944 may output the information to the transceiver 910 (e.g., that transmits the information via radio frequency signaling or some other type of signaling suitable for the applicable communication medium). In some examples, the communication and processing circuitry 944 may send one or more of signals, messages, other information, or any combination thereof. In some examples, the communication and processing circuitry 944 may send information via one or more channels. In some examples, the communication and processing circuitry 944 may include functionality for a means for sending (e.g., a means for transmitting). In some examples, the communication and processing circuitry 944 may include functionality for a means for generating, including a means for modulating, a means for encoding, etc.

In examples in which the IAB node 900 is an IAB donor node including a CU, the communication and processing circuitry 944 may be configured to transmit one or more DU resource configurations 915 to another IAB node (e.g., the DU of the other IAB node) in the IAB network via the transceiver 910. For example, the communication and processing circuitry 944 may be configured to generate and transmit an F1-AP message including the DU resource configuration(s) 915 to the other IAB node (IAB-DU). In this example, each DU resource configuration 915 may include a first DU resource configuration for a first spectrum band (e.g., an uplink frequency band) of paired spectrum and a second DU resource configuration for a second spectrum band (e.g., a downlink spectrum band) of the paired spectrum when the other IAB node is operating in FDD bands. For example, each DU resource configuration 915 may be associated with a respective cell served by the other IAB node. As an example, the F1-AP message may include an Activated Cells to be Updated List IE that includes the list of activated cells served by the IAB-DU for which an updated DU resource configuration is included in the F1-AP message. For each cell in the Activated Cells to be Updated List IE, the F1-AP message may further include an IAB-DU Cell Resource Configuration IE that includes a cell resource configuration for the paired spectrum (e.g., the uplink and downlink DU resource configurations for that cell).

In addition, the DU resource configurations 915 included in the F1-AP message may further include child DU resource configurations for one or more child IAB nodes of the other IAB node. For example, the F1-AP message may further include a Child-Node List IE that includes a list of child IAB nodes of the IAB-DU. For each child IAB node and each cell served by the child IAB node, the F1-AP message may further include a corresponding IAB-DU Cell Resource Configuration IE for the cell served by the child IAB node. The IAB-DU Cell Resource Configuration IE may include two DU resource configurations (e.g., one for uplink and one for downlink) for the child IAB node cell.

In examples in which the IAB node 900 is a parent or child IAB node, the communication and processing circuitry 944 may be configured to receive the DU resource configuration(s) 915 from the CU of the IAB donor node (e.g., via the F1-AP message) via the transceiver 910 and to store the DU resource configurations(s) 915 within the memory 905. In examples in which the IAB node is a parent IAB node 900, the communication and processing circuitry 944 may further be configured to generate and transmit the AIs 916 for a child IAB node to the child IAB node via the transceiver 910. The AIs 916 may be transmitted, for example, within DCI having a format 2_5. In addition, in examples in which the IAB node 900 is a child IAB node, the communication and processing circuitry 944 may be configured to receive the AIs 916 from a parent IAB node via the transceiver 910 and to store the AIs 916 within, for example, memory 905.

In examples in which the IAB node 900 is a parent IAB node, the communication and processing circuitry 944 may further be configured to generate and transmit scheduling information to one or more child nodes for uplink or downlink communication with the one or more child nodes (e.g., UEs or child IAB nodes) via the transceiver 910. The scheduling information may be determined by the resource assignment and scheduling circuitry 942 using the DU resource configuration 915 associated with the cell serving the one or more child nodes, along with child DU resource configuration(s) 915 of the child IAB nodes, and the AIs 916 received from the parent IAB node of the IAB node 900. The communication and processing circuitry 944 may further be configured to execute communication and processing instructions (software) 954 included on the computer-readable medium 906 to implement one or more functions described herein.

In examples in which the IAB node 900 is an IAB donor node including a CU, the processor 904 may further include DU resource configuration generation circuitry 946, configured to generate one or more DU resource configurations 915 for one or more FDD cells served by the IAB node 900 and/or one or more FDD cells served by one or more other IAB nodes in the IAB network. Each DU configuration 915 may include two semi-static DU resource configurations, each for a corresponding spectrum band (e.g., UL or DL portion) of the paired spectrum. For example, each DU resource configuration 915 may include a first DU resource configuration for a first spectrum band of paired spectrum and a second DU resource configuration for a second spectrum band of the paired spectrum. In some examples, the first DU resource configuration may include an uplink DU resource configuration for an uplink portion of the paired spectrum, whereas the second DU resource configuration may include a downlink DU resource configuration for a downlink portion of the paired spectrum.

In some examples, the uplink DU resource configuration includes an uplink symbol pattern for a plurality of uplink slots and the downlink DU resource configuration includes a downlink symbol pattern for a plurality of downlink slots. In some examples, the uplink symbol pattern includes a respective symbol type for each of a plurality of symbols in each uplink slot. For example, the symbol types for the uplink symbol pattern may include an uplink symbol type (U) or a flexible symbol type (F). Thus, the uplink symbol pattern includes a U/F pattern for the UL portion of the paired spectrum. In some examples, the downlink symbol pattern also includes a respective symbol type for each of a plurality of symbols in each downlink slot. For example, the symbol types for the downlink symbol pattern may include a downlink symbol type (D) or a flexible symbol type (F). Thus, the downlink symbol pattern includes a D/F pattern for the DL portion of the paired spectrum. Each of the uplink and downlink DU resource configurations may further include a respective availability attribute (e.g., hard symbol attribute (H), soft symbol attribute (S), or not available attribute (NA)) for each symbol type. For example, the uplink DU resource configuration may include a respective availability attribute for each of the U and F symbol types. In addition, the downlink DU resource configuration may also include a respective availability attribute for each of the D and F symbol types. The DU resource configuration generation circuitry 946 may further be configured to execute DU resource configuration instructions (software) 956 included on the computer-readable medium 906 to implement one or more functions described herein.

Figure 10:
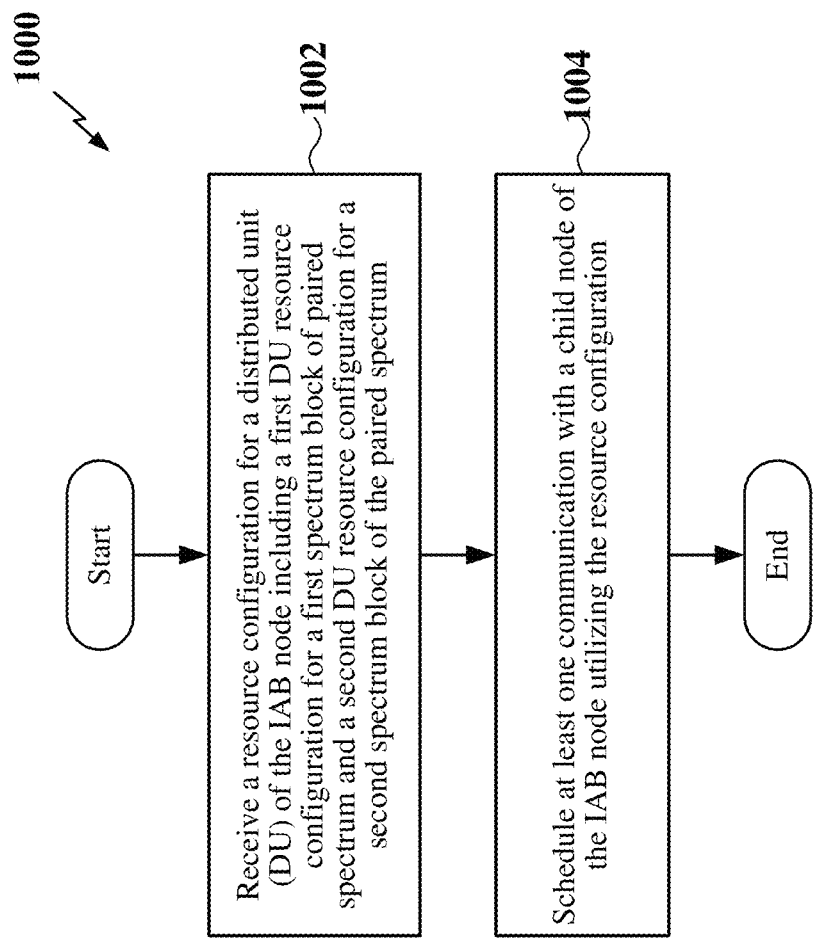
FIG. 10 is a flow chart of an exemplary method for IAB-DU resource configuration in paired spectrum according to some aspects.

FIG. 10 is a flow chart of an exemplary method for IAB-DU resource configuration in paired spectrum according to some aspects. As described below, some or all illustrated features may be omitted in a particular implementation within the scope of the present disclosure, and some illustrated features may not be required for implementation of all embodiments. In some examples, the method may be performed by the IAB node 900, as described above and illustrated in FIG. 9, by a processor or processing system, or by any suitable means for carrying out the described functions.

At block 1002, the IAB node may receive a resource configuration for a distributed unit (DU) of the IAB node including a first DU resource configuration for a first spectrum band of paired spectrum and a second DU resource configuration for a second spectrum band of the paired spectrum. In some examples, the first DU resource configuration includes an uplink DU resource configuration and the second DU resource configuration includes a downlink DU resource configuration. The IAB node may receive an F1-Application Protocol (F1-AP) message including the resource configuration from a central unit (CU) of an IAB donor node.

In some examples, the uplink DU resource configuration includes an uplink symbol pattern for each of a plurality of uplink slots and the downlink DU resource configuration includes a downlink symbol pattern for each of a plurality of downlink slots. The uplink symbol pattern may include a respective first symbol type for each of a plurality of first symbols in each of the plurality of uplink slots. The respective first symbol type may include an uplink symbol type or a flexible symbol type. The downlink symbol pattern may include a respective second symbol type for each of a plurality of second symbols in each of the plurality of downlink slots. The respective second symbol type may include a downlink symbol type or the flexible symbol type. In some examples, the uplink DU resource configuration further includes a respective first availability attribute for each of the first symbol types in each of the plurality of uplink slots and the downlink DU resource configuration further includes a respective second availability attribute for each of the second symbol types in each of the plurality of downlink slots. Each of the respective first availability attributes and each of the respective second availability attributes may include one of a hard symbol attribute, a soft symbol attribute, or a not available symbol attribute.

In some examples, the resource configuration is associated with a first cell served by the IAB node. In this example, the IAB node may further receive an information element including a list of activated cells to be updated. The list of activated cells may include the first cell. Each cell within the list of activated cells may include a respective cell resource configuration for the paired spectrum. Each cell resource configuration may include an uplink DU resource configuration and a downlink DU resource configuration for that cell.

In some examples, the IAB node may further receive a child resource configuration (e.g., child DU resource configuration) for the child node. The child resource configuration includes a first child DU resource configuration for the first spectrum band and a second child DU resource configuration for the second spectrum band. The first child resource configuration may include an uplink symbol pattern for each of a plurality of uplink slots and the second child resource configuration may include a downlink symbol pattern for each of a plurality of downlink slots. In some examples, the IAB node may further receive a plurality of child resource configurations including the child resource configuration. Each of the plurality of child resource configurations may be associated with a different respective child node of the IAB node or a different respective cell associated with the child node. For example, the communication and processing circuitry 944 and transceiver 910, shown and described above in connection with FIG. 9, may provide a means to receive the DU resource configuration.

At block 1004, the IAB node may schedule at least one communication with a child node of the IAB node utilizing the resource configuration. In some examples, the IAB node may schedule the at least one communication with the child node utilizing the resource configuration and the child resource configuration of the child node. For example, the resource assignment and scheduling circuitry 942 shown and described above in connection with FIG. 9 may provide a means to schedule the at least one communication.

Figure 11:
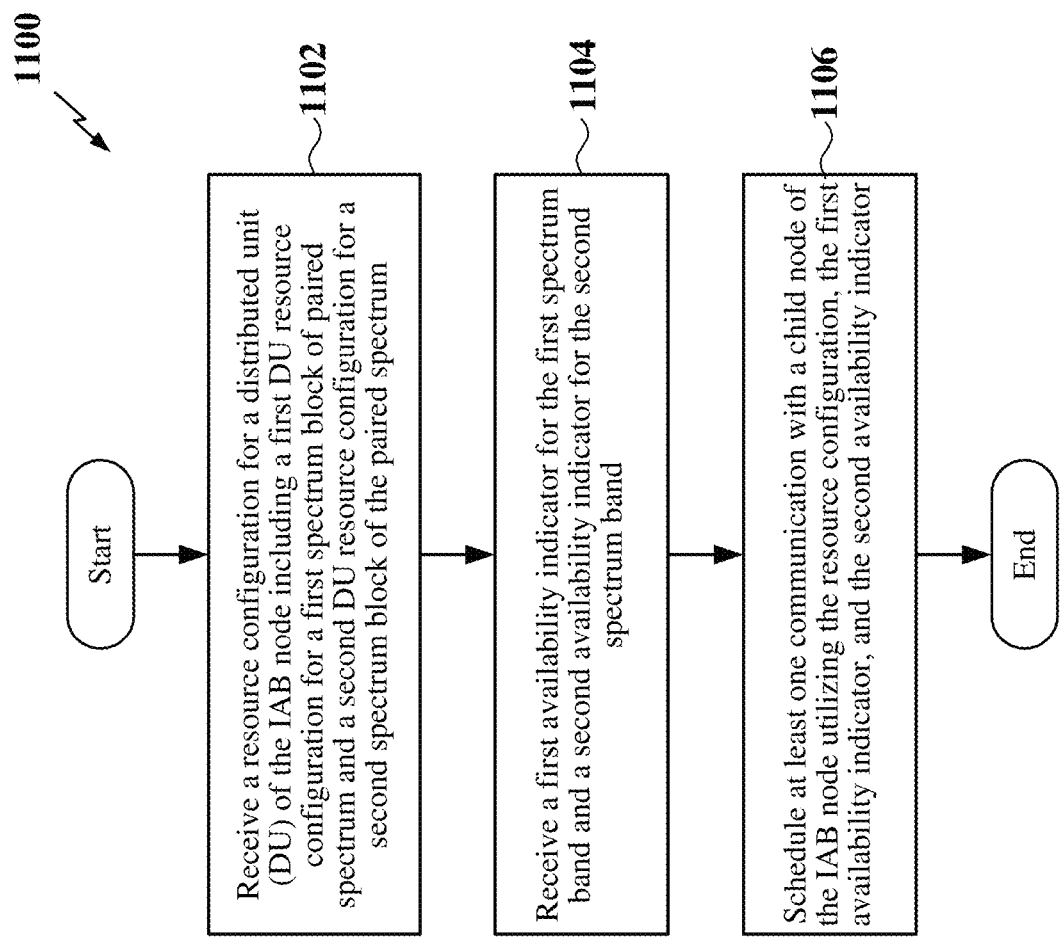
FIG. 11 is a flow chart of another exemplary method for IAB-DU resource configuration in paired spectrum according to some aspects.

FIG. 11 is a flow chart of another exemplary method for IAB-DU resource configuration in paired spectrum according to some aspects. As described below, some or all illustrated features may be omitted in a particular implementation within the scope of the present disclosure, and some illustrated features may not be required for implementation of all embodiments. In some examples, the method may be performed by the IAB node 900, as described above and illustrated in FIG. 9, by a processor or processing system, or by any suitable means for carrying out the described functions.

At block 1102, the IAB node may receive a resource configuration for a distributed unit (DU) of the IAB node including a first DU resource configuration for a first spectrum band of paired spectrum and a second DU resource configuration for a second spectrum band of the paired spectrum. In some examples, the first DU resource configuration includes an uplink DU resource configuration and the second DU resource configuration includes a downlink DU resource configuration. The IAB node may receive an F1-Application Protocol (F1-AP) message including the resource configuration from a central unit (CU) of an IAB donor node.

In some examples, the uplink DU resource configuration includes an uplink symbol pattern for each of a plurality of uplink slots and the downlink DU resource configuration includes a downlink symbol pattern for each of a plurality of downlink slots. The uplink symbol pattern may include a respective first symbol type for each of a plurality of first symbols in each of the plurality of uplink slots. The respective first symbol type may include an uplink symbol type or a flexible symbol type. The downlink symbol pattern may include a respective second symbol type for each of a plurality of second symbols in each of the plurality of downlink slots. The respective second symbol type may include a downlink symbol type or the flexible symbol type. In some examples, the uplink DU resource configuration further includes a respective first availability attribute for each of the first symbol types in each of the plurality of uplink slots and the downlink DU resource configuration further includes a respective second availability attribute for each of the second symbol types in each of the plurality of downlink slots. Each of the respective first availability attributes and each of the respective second availability attributes may include one of a hard symbol attribute, a soft symbol attribute, or a not available symbol attribute.

In some examples, the resource configuration is associated with a first cell served by the IAB node. In this example, the IAB node may further receive an information element including a list of activated cells to be updated. The list of activated cells may include the first cell. Each cell within the list of activated cells may include a respective cell resource configuration for the paired spectrum. Each cell resource configuration may include an uplink DU resource configuration and a downlink DU resource configuration for that cell.

In some examples, the IAB node may further receive a child resource configuration (e.g., child DU resource configuration) for the child node. The child resource configuration includes a first child DU resource configuration for the first spectrum band and a second child DU resource configuration for the second spectrum band. The first child resource configuration may include an uplink symbol pattern for each of a plurality of uplink slots and the second child resource configuration may include a downlink symbol pattern for each of a plurality of downlink slots. In some examples, the IAB node may further receive a plurality of child resource configurations including the child resource configuration. Each of the plurality of child resource configurations may be associated with a different respective child node of the IAB node or a different respective cell associated with the child node. For example, the communication and processing circuitry 944 and transceiver 910, shown and described above in connection with FIG. 9, may provide a means to receive the DU resource configuration.

At 1104, the IAB node may receive a first availability indicator for the first spectrum band and a second availability indicator for the second spectrum band. The first availability indicator may indicate a respective availability of one or more of the first symbol types having the soft symbol attribute in one or more uplink slots of the plurality of uplink slots. The second availability indicator may indicate a respective availability of one or more of the second symbol types having the soft symbol attribute in one or more downlink slots of the plurality of downlink slots. The first and second availability indicators may be received, for example, from a parent IAB node of the IAB node. In some examples, the IAB node may receive downlink control information (DCI) including the first availability indicator and the second availability indicator. The DCI may have a DCI format 2_5. For example, the communication and processing circuitry 944 and transceiver 910, shown and described above in connection with FIG. 9, may provide a means to receive the first and second availability indicators.

At block 1106, the IAB node may schedule at least one communication with a child node of the IAB node utilizing the resource configuration, the first availability attribute, and the second availability attribute. In some examples, the IAB node may schedule the at least one communication with the child node utilizing the resource configuration and the child resource configuration of the child node. For example, the resource assignment and scheduling circuitry 942 shown and described above in connection with FIG. 9 may provide a means to schedule the at least one communication.

Figure 12:
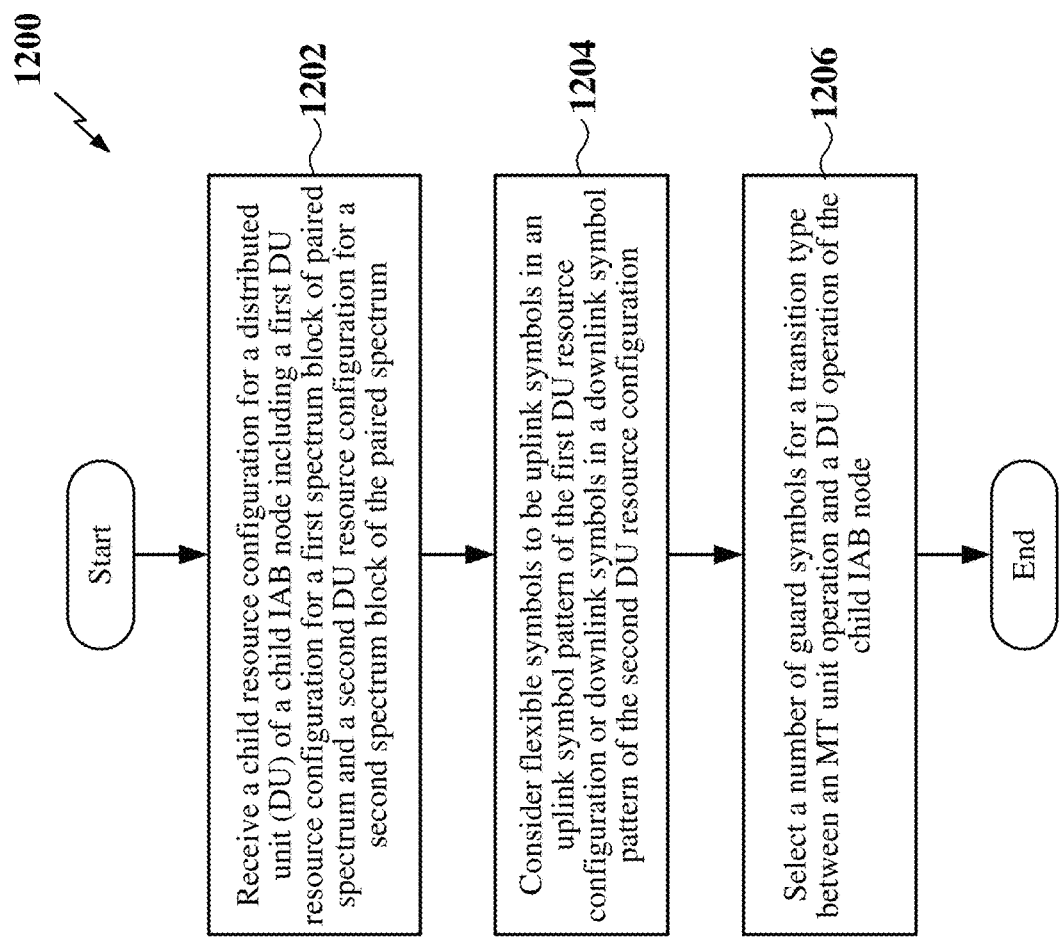
FIG. 12 is a flow chart of another exemplary method for IAB-DU resource configuration in paired spectrum according to some aspects.

FIG. 12 is a flow chart of another exemplary method for IAB-DU resource configuration in paired spectrum according to some aspects. As described below, some or all illustrated features may be omitted in a particular implementation within the scope of the present disclosure, and some illustrated features may not be required for implementation of all embodiments. In some examples, the method may be performed by the IAB node 900, as described above and illustrated in FIG. 9, by a processor or processing system, or by any suitable means for carrying out the described functions.

At block 1202, the IAB node may receive a child resource configuration for a distributed unit (DU) of a child IAB node of the IAB node. The resource configuration may include a first DU resource configuration for a first spectrum band of paired spectrum and a second DU resource configuration for a second spectrum band of the paired spectrum. In some examples, the first DU resource configuration includes an uplink DU resource configuration and the second DU resource configuration includes a downlink DU resource configuration. The IAB node may receive an F1-Application Protocol (F1-AP) message including the child resource configuration from a central unit (CU) of an IAB donor node.

In some examples, the uplink DU resource configuration includes an uplink symbol pattern for each of a plurality of uplink slots and the downlink DU resource configuration includes a downlink symbol pattern for each of a plurality of downlink slots. The uplink symbol pattern may include a respective first symbol type for each of a plurality of first symbols in each of the plurality of uplink slots. The respective first symbol type may include an uplink symbol type or a flexible symbol type. The downlink symbol pattern may include a respective second symbol type for each of a plurality of second symbols in each of the plurality of downlink slots. The respective second symbol type may include a downlink symbol type or the flexible symbol type. In some examples, the uplink DU resource configuration further includes a respective first availability attribute for each of the first symbol types in each of the plurality of uplink slots and the downlink DU resource configuration further includes a respective second availability attribute for each of the second symbol types in each of the plurality of downlink slots. Each of the respective first availability attributes and each of the respective second availability attributes may include one of a hard symbol attribute, a soft symbol attribute, or a not available symbol attribute. For example, the communication and processing circuitry 944 and transceiver 910, shown and described above in connection with FIG. 9, may provide a means to receive the DU resource configuration.

At 1204, the IAB node may consider flexible symbols to be uplink symbols in an uplink symbol pattern of the first DU resource configuration or downlink symbols in a downlink symbol pattern of the second DU resource configuration of the child IAB node. For example, the resource assignment and scheduling circuitry 942, shown and described above in connection with FIG. 9, may provide a means to consider flexible symbols as uplink symbols in the uplink symbol pattern or downlink symbols in the downlink symbol pattern.

At block 1206, the IAB node may select a number of guard symbols for a transition type between an MT unit operation and a DU operation of the child IAB node. For example, the resource assignment and scheduling circuitry 942 shown and described above in connection with FIG. 9 may provide a means to select the number of guard symbols.

In one configuration, the IAB node 900 includes means for receiving a resource configuration for a distributed unit (DU) of the IAB node, the resource configuration including a first DU resource configuration for a first spectrum band of paired spectrum and a second DU resource configuration for a second spectrum band of the paired spectrum, as described herein. The IAB node 900 further includes means for scheduling at least one communication with a child node of the IAB node utilizing the resource configuration, as described herein. In one aspect, the aforementioned means may be the processor 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1, 3, and/or 4-8, and utilizing, for example, the processes and/or algorithms described herein in relation to FIGS. 10-12.

Figure 13:
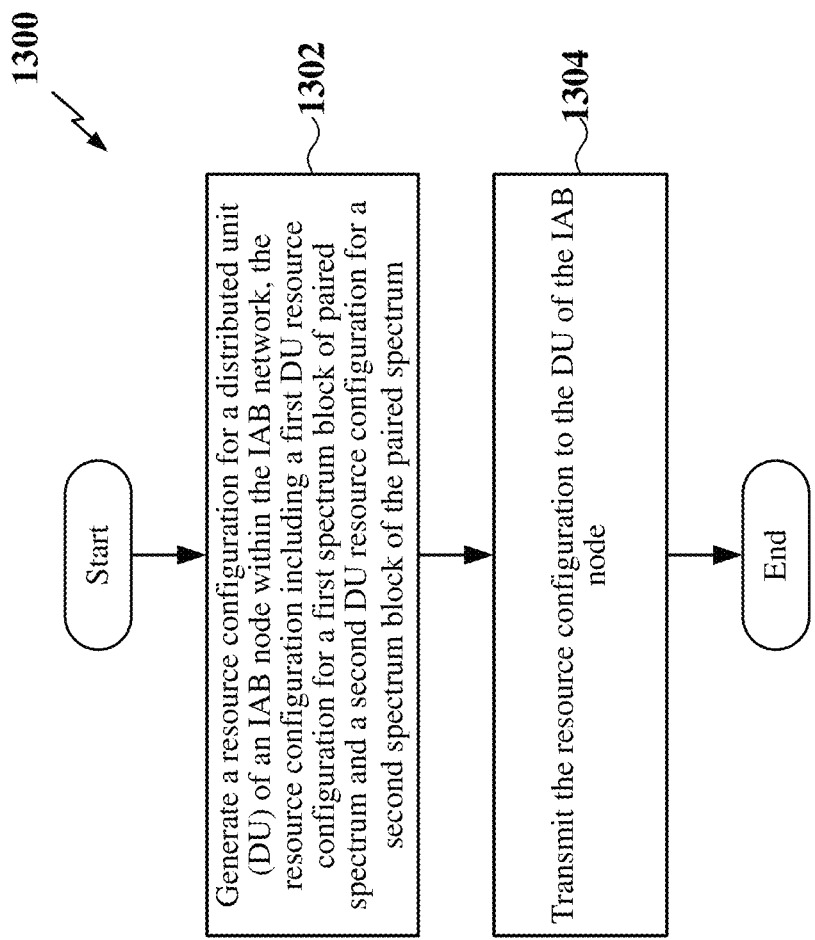
FIG. 13 is a flow chart of another exemplary method for IAB-DU resource configuration in paired spectrum according to some aspects.

FIG. 13 is a flow chart of another exemplary method for IAB-DU resource configuration in paired spectrum according to some aspects. As described below, some or all illustrated features may be omitted in a particular implementation within the scope of the present disclosure, and some illustrated features may not be required for implementation of all embodiments. In some examples, the method may be performed by the IAB node 900, as described above and illustrated in FIG. 9, by a processor or processing system, or by any suitable means for carrying out the described functions.

At block 1302, the IAB node (e.g., an IAB donor node) may generate a resource configuration for a distributed unit (DU) of an IAB node within the IAB network. The resource configuration may include a first DU resource configuration for a first spectrum block of paired spectrum and a second DU resource configuration for a second spectrum block of the paired spectrum. In some examples, the first DU resource configuration includes an uplink DU resource configuration and the second DU resource configuration includes a downlink DU resource configuration.

In some examples, the uplink DU resource configuration includes an uplink symbol pattern for each of a plurality of uplink slots and the downlink DU resource configuration includes a downlink symbol pattern for each of a plurality of downlink slots. The uplink symbol pattern may include a respective first symbol type for each of a plurality of first symbols in each of the plurality of uplink slots. The respective first symbol type may include an uplink symbol type or a flexible symbol type. The downlink symbol pattern may include a respective second symbol type for each of a plurality of second symbols in each of the plurality of downlink slots. The respective second symbol type may include a downlink symbol type or the flexible symbol type. In some examples, the uplink DU resource configuration further includes a respective first availability attribute for each of the first symbol types in each of the plurality of uplink slots and the downlink DU resource configuration further includes a respective second availability attribute for each of the second symbol types in each of the plurality of downlink slots. Each of the respective first availability attributes and each of the respective second availability attributes may include one of a hard symbol attribute, a soft symbol attribute, or a not available symbol attribute. For example, the DU resource configuration generation circuitry 946 shown and described above in connection with FIG. 9, may provide a means to generate the DU resource configuration for the IAB node.

At block 1304, the IAB node may transmit the resource configuration to the DU of the IAB node. For example, the IAB donor node may transmit an F1-Application Protocol (F1-AP) message including the resource configuration from the CU of the IAB donor node to the IAB node.

In some examples, the resource configuration is associated with a first cell served by the IAB node. In this example, the IAB donor node may further transmit an information element including a list of activated cells to be updated. The list of activated cells may include the first cell. Each cell within the list of activated cells may include a respective cell resource configuration for the paired spectrum. Each cell resource configuration may include an uplink DU resource configuration and a downlink DU resource configuration for that cell.

In some examples, the IAB donor node may further transmit a child resource configuration (e.g., child DU resource configuration) for a child node (e.g., a child IAB node) of the IAB node. The child resource configuration includes a first child DU resource configuration for the first spectrum band and a second child DU resource configuration for the second spectrum band. The first child resource configuration may include an uplink symbol pattern for each of a plurality of uplink slots and the second child resource configuration may include a downlink symbol pattern for each of a plurality of downlink slots. In some examples, the IAB donor node may further transmit a plurality of child resource configurations including the child resource configuration. Each of the plurality of child resource configurations may be associated with a different respective child node of the IAB node or a different respective cell associated with the child node. For example, the communication and processing circuitry 944 together with the transceiver 910 shown and described above in connection with FIG. 9 may provide a means to transmit the resource configuration to the DU of the IAB node.

In one configuration, the IAB node 900 includes means for generating a resource configuration for a distributed unit (DU) of an IAB node within the IAB network, the resource configuration including a first DU resource configuration for a first spectrum band of paired spectrum and a second DU resource configuration for a second spectrum band of the paired spectrum, as described herein. The IAB node 900 further includes means for transmitting the resource configuration to the DU of the IAB node, as described herein. In one aspect, the aforementioned means may be the processor 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1, 3, and/or 4-8, and utilizing, for example, the processes and/or algorithms described herein in relation to FIG. 13.

The processes shown in FIGS. 10-13 may include additional aspects, such as any single aspect or any combination of aspects described below and/or in connection with one or more other processes described elsewhere herein.

Aspect 1: A method of wireless communication at an integrated access backhaul (IAB) node within an IAB network, the method comprising: receiving a resource configuration for a distributed unit (DU) of the IAB node, the resource configuration comprising a first DU resource configuration for a first spectrum band of paired spectrum and a second DU resource configuration for a second spectrum band of the paired spectrum; and scheduling at least one communication with a child node of the IAB node utilizing the resource configuration.

Aspect 2: The method of aspect 1, wherein the first DU resource configuration comprises an uplink DU resource configuration and the second DU resource configuration comprises a downlink DU resource configuration.

Aspect 3: The method of aspect 2, wherein: the uplink DU resource configuration comprises an uplink symbol pattern for each of a plurality of uplink slots and the downlink DU resource configuration comprises a downlink symbol pattern for each of a plurality of downlink slots, the uplink symbol pattern comprises a respective first symbol type for each of a plurality of first symbols in each of the plurality of uplink slots, wherein the respective first symbol type comprises an uplink symbol type or a flexible symbol type, and the downlink symbol pattern comprises a respective second symbol type for each of a plurality of second symbols in each of the plurality of downlink slots, wherein the respective second symbol type comprises a downlink symbol type or the flexible symbol type.

Aspect 4: The method of aspect 3, wherein the uplink DU resource configuration further comprises a respective first availability attribute for each of the first symbol types in each of the plurality of uplink slots and the downlink DU resource configuration further comprises a respective second availability attribute for each of the second symbol types in each of the plurality of downlink slots.

Aspect 5: The method of aspect 4, wherein each of the respective first availability attributes and each of the respective second availability attributes comprise one of a hard symbol attribute, a soft symbol attribute, or a not available symbol attribute.

Aspect 6: The method of aspect 5, further comprising: receiving a first availability indicator for the first spectrum band and a second availability indicator for the second spectrum band, the first availability indicator indicating a respective availability of one or more of the first symbol types comprising the soft symbol attribute in one or more uplink slots of the plurality of uplink slots and the second availability indicator indicating a respective availability of one or more of the second symbol types comprising the soft symbol attribute in one or more downlink slots of the plurality of downlink slots, and wherein scheduling the at least one communication with the child node further comprises: scheduling the at least one communication with the child node utilizing the resource configuration, the first availability indicator, and the second availability indicator.

Aspect 7: The method of aspect 6, wherein the receiving the first availability indicator and the second availability indicator further comprises: receiving downlink control information (DCI) comprising the first availability indicator and the second availability indicator, wherein the DCI comprises a DCI format 2_5.

Aspect 8: The method of any of aspects 1 through 7, wherein the resource configuration is associated with a first cell served by the IAB node, and wherein the receiving the resource configuration further comprises: receiving an information element comprising a list of activated cells to be updated, wherein the list of activated cells comprises the first cell, and wherein each cell within the list of activated cells comprises a respective cell resource configuration for the paired spectrum.

Aspect 9: The method of any of aspects 1 through 8, further comprising: receiving a child resource configuration for the child node, wherein the child resource configuration comprises a first child DU resource configuration for the first spectrum band and a second child DU resource configuration for the second spectrum band, and wherein the scheduling the at least one communication with the child node further comprises: scheduling the at least one communication with the child node utilizing the resource configuration and the child resource configuration.

Aspect 10: The method of aspect 9, wherein the first child DU resource configuration comprises an uplink symbol pattern for each of a plurality of uplink slots and the second child DU resource configuration comprises a downlink symbol pattern for each of a plurality of downlink slots.

Aspect 11: The method of aspect 10, further comprising: considering flexible symbols to be uplink symbols in the uplink symbol pattern or downlink symbols in the downlink symbol pattern in selecting a number of guard symbols for a transition type between a mobile termination (MT) unit operation and a DU operation of the child node.

Aspect 12: The method of any of aspects 9 through 11, wherein the receiving the child resource configuration for the child node further comprises: receiving a plurality of child DU resource configurations comprising the child resource configuration, each of the plurality of child DU resource configurations associated with a different respective child node of the IAB node or a different respective cell associated with the child node.

Aspect 13: The method of any of aspects 1 through 12, wherein the receiving the resource configuration further comprises: receiving an F1-Application Protocol (F1-AP) message comprising the resource configuration from a central unit (CU) of an IAB donor node.

Aspect 14: A method of wireless communication at an integrated access backhaul (IAB) donor node within an IAB network, the method comprising: generating a resource configuration for a distributed unit (DU) of an IAB node within the IAB network, the resource configuration comprising a first DU resource configuration for a first spectrum band of paired spectrum and a second DU resource configuration for a second spectrum band of the paired spectrum; and transmitting the resource configuration to the DU of the IAB node.

Aspect 15: The method of aspect 14, wherein the first DU resource configuration comprises an uplink DU resource configuration and the second DU resource configuration comprises a downlink DU resource configuration.

Aspect 16: The method of aspect 15, wherein: the uplink DU resource configuration comprises an uplink symbol pattern for an uplink slot and the downlink DU resource configuration comprises a downlink symbol pattern for a downlink slot, the uplink symbol pattern comprises a respective first symbol type for each of a plurality of first symbols in the uplink slot, wherein the respective first symbol type comprises an uplink symbol type or a flexible symbol type, and the downlink symbol pattern comprises a respective second symbol type for each of a plurality of second symbols in the downlink slot, wherein the respective second symbol type comprises a downlink symbol type or the flexible symbol type.

Aspect 17: The method of aspect 16, wherein the uplink DU resource configuration further comprises a respective first availability attribute for each of the first symbol types in the uplink slot and the downlink DU resource configuration further comprises a respective second availability attribute for each of the second symbol types in the downlink slot.

Aspect 18: The method of aspect 17, wherein each of the respective first availability attributes and each of the respective second availability attributes comprise one of a hard symbol attribute, a soft symbol attribute, or a not available symbol attribute.

Aspect 19: The method of any of aspects 14 through 18, wherein the resource configuration is associated with a first cell served by the IAB node, and wherein the transmitting the resource configuration further comprises: transmitting an information element comprising a list of activated cells to be updated, wherein the list of activated cells comprises the first cell, and wherein each cell within the list of activated cells comprises a respective cell resource configuration.

Aspect 20: The method of any of aspects 14 through 19, further comprising: transmitting a child resource configuration for a child node of the IAB node, wherein the child resource configuration comprises a first child DU resource configuration for the first spectrum band and a second child DU resource configuration for the second spectrum band.

Aspect 21: The method of aspect 20, wherein the transmitting the child resource configuration for the child node further comprises: transmitting a plurality of child DU resource configurations comprising the child resource configuration, each of the plurality of child DU resource configurations being associated with a different respective child node of the IAB node or a different respective cell associated with the child node.

Aspect 22: The method of any of aspects 14 through 21, wherein the transmitting the resource configuration further comprises: transmitting an F1-Application Protocol (F1-AP) message comprising the resource configuration from a central unit (CU) of the IAB donor node to the IAB node.

Aspect 23: An apparatus configured for wireless communication comprising a transceiver, a memory, and a processor coupled to the wireless transceiver and the memory, the processor and the memory configured to perform a method of any one of aspects 1 through 13 or aspects 14 through 22.

Aspect 24: An apparatus in a wireless communication network comprising at least one means for performing a method of any one of aspects 1 through 13 or aspects 14 through 22.

Aspect 25: A non-transitory computer-readable medium storing computer-executable code, comprising code for causing an apparatus in a wireless communication network to perform a method of any one of aspects 1 through 13 or aspects 14 through 22.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, and/or 4-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at an integrated access backhaul (IAB) node within an IAB network, the method comprising:
   receiving a resource configuration for a distributed unit (DU) of the IAB node, the resource configuration comprising a first DU resource configuration for a first spectrum band of paired spectrum and a second DU resource configuration for a second spectrum band of the paired spectrum, wherein the first DU resource configuration comprises an uplink symbol pattern for each of a plurality of uplink slots and the second DU resource configuration comprises a downlink symbol pattern for each of a plurality of downlink slots; and
   scheduling at least one communication with a child node of the IAB node utilizing the resource configuration.

2. The method of claim 1, wherein:
   the uplink symbol pattern comprises a respective first symbol type for each of a plurality of first symbols in each of the plurality of uplink slots, wherein the respective first symbol type comprises an uplink symbol type or a flexible symbol type, and
   the downlink symbol pattern comprises a respective second symbol type for each of a plurality of second symbols in each of the plurality of downlink slots, wherein the respective second symbol type comprises a downlink symbol type or the flexible symbol type.

3. The method of claim 2, wherein the uplink DU resource configuration further comprises a respective first availability attribute for each of the first symbol types in each of the plurality of uplink slots and the downlink DU resource configuration further comprises a respective second availability attribute for each of the second symbol types in each of the plurality of downlink slots.

4. The method of claim 3, wherein each of the respective first availability attributes and each of the respective second availability attributes comprise one of a hard symbol attribute, a soft symbol attribute, or a not available symbol attribute.

5. The method of claim 4, further comprising:
   receiving a first availability indicator for the first spectrum band and a second availability indicator for the second spectrum band, the first availability indicator indicating a respective availability of one or more of the first symbol types comprising the soft symbol attribute in one or more uplink slots of the plurality of uplink slots and the second availability indicator indicating a respective availability of one or more of the second symbol types comprising the soft symbol attribute in one or more downlink slots of the plurality of downlink slots, and wherein scheduling the at least one communication with the child node further comprises:
   scheduling the at least one communication with the child node utilizing the resource configuration, the first availability indicator, and the second availability indicator.

6. The method of claim 5, wherein the receiving the first availability indicator and the second availability indicator further comprises:
   receiving downlink control information (DCI) comprising the first availability indicator and the second availability indicator, wherein the DCI comprises a DCI format 2_5.

7. The method of claim 1, wherein the resource configuration is associated with a first cell served by the IAB node, and wherein the receiving the resource configuration further comprises:
   receiving an information element comprising a list of activated cells to be updated, wherein the list of activated cells comprises the first cell, and wherein each cell within the list of activated cells comprises a respective cell resource configuration for the paired spectrum.

8. The method of claim 1, further comprising:
   receiving a child resource configuration for the child node, wherein the child resource configuration comprises a first child DU resource configuration for the first spectrum band and a second child DU resource configuration for the second spectrum band, and wherein the scheduling the at least one communication with the child node further comprises:
   scheduling the at least one communication with the child node utilizing the resource configuration and the child resource configuration.

9. The method of claim 8, wherein the first child DU resource configuration comprises an uplink symbol pattern for each of a plurality of uplink slots and the second child DU resource configuration comprises a downlink symbol pattern for each of a plurality of downlink slots.

10. The method of claim 9, further comprising:
considering flexible symbols to be uplink symbols in the uplink symbol pattern or downlink symbols in the downlink symbol pattern in selecting a number of guard symbols for a transition type between a mobile termination (MT) unit operation and a DU operation of the child node.

11. The method of claim 8, wherein the receiving the child resource configuration for the child node further comprises:
receiving a plurality of child DU resource configurations comprising the child resource configuration, each of the plurality of child DU resource configurations associated with a different respective child node of the IAB node or a different respective cell associated with the child node.

12. The method of claim 1, wherein the receiving the resource configuration further comprises:
receiving an F1-Application Protocol (F1-AP) message comprising the resource configuration from a central unit (CU) of an IAB donor node.

13. An integrated access backhaul (IAB) node configured for wireless communication, comprising:
a transceiver;
a memory; and
a processor coupled to the transceiver and the memory, wherein the processor and the memory are configured to:
receive a resource configuration for a distributed unit (DU) of the IAB node via the transceiver, the resource configuration comprising a first DU resource configuration for a first spectrum band of paired spectrum and a second DU resource configuration for a second spectrum band of the paired spectrum, wherein the first DU resource configuration comprises an uplink symbol pattern for each of a plurality of uplink slots and the second DU resource configuration comprises a downlink symbol pattern for each of a plurality of downlink slots; and
schedule at least one communication with a child node of the IAB node utilizing the resource configuration.

14. The IAB node of claim 13, wherein:
the uplink symbol pattern comprises a respective first symbol type for each of a plurality of first symbols in each of the plurality of uplink slots, wherein the respective first symbol type comprises an uplink symbol type or a flexible symbol type, and
the downlink symbol pattern comprises a respective second symbol type for each of a plurality of second symbols in each of the plurality of downlink slots, wherein the respective second symbol type comprises a downlink symbol type or the flexible symbol type.

15. The IAB node of claim 14, wherein the uplink DU resource configuration further comprises a respective first availability attribute for each of the first symbol types in each of the plurality of uplink slots and the downlink DU resource configuration further comprises a respective second availability attribute for each of the second symbol types in each of the plurality of downlink slots, wherein each of the respective first availability attributes and each of the respective second availability attributes comprise one of a hard symbol attribute, a soft symbol attribute, or a not available symbol attribute.

16. The IAB node of claim 15, wherein the processor and the memory are further configured to:
receive a first availability indicator for the first spectrum band and a second availability indicator for the second spectrum band via the transceiver, the first availability indicator indicating a respective availability of one or more of the first symbol types comprising the soft symbol attribute in one or more uplink slots of the plurality of uplink slots and the second availability indicator indicating a respective availability of one or more of the second symbol types comprising the soft symbol attribute in one or more downlink slots of the plurality of downlink slots; and
schedule the at least one communication with the child node utilizing the resource configuration, the first availability indicator, and the second availability indicator.

17. The IAB node of claim 16, wherein the first availability indicator and the second availability indicator are received within downlink control information (DCI), wherein the DCI comprises a DCI format 2_5.

18. A method of wireless communication at an integrated access backhaul (IAB) donor node within an IAB network, the method comprising:
generating a resource configuration for a distributed unit (DU) of an IAB node within the IAB network, the resource configuration comprising a first DU resource configuration for a first spectrum band of paired spectrum and a second DU resource configuration for a second spectrum band of the paired spectrum, wherein the first DU resource configuration comprises an uplink symbol pattern for each of a plurality of uplink slots and the second DU resource configuration comprises a downlink symbol pattern for each of a plurality of downlink slots; and
transmitting the resource configuration to the DU of the IAB node.

19. The method of claim 18, wherein:
the uplink symbol pattern comprises a respective first symbol type for each of a plurality of first symbols in the uplink slot, wherein the respective first symbol type comprises an uplink symbol type or a flexible symbol type, and
the downlink symbol pattern comprises a respective second symbol type for each of a plurality of second symbols in the downlink slot, wherein the respective second symbol type comprises a downlink symbol type or the flexible symbol type.

20. The method of claim 19, wherein the uplink DU resource configuration further comprises a respective first availability attribute for each of the first symbol types in the uplink slot and the downlink DU resource configuration further comprises a respective second availability attribute for each of the second symbol types in the downlink slot.

21. The method of claim 20, wherein each of the respective first availability attributes and each of the respective second availability attributes comprise one of a hard symbol attribute, a soft symbol attribute, or a not available symbol attribute.

22. The method of claim 18, wherein the resource configuration is associated with a first cell served by the IAB node, and wherein the transmitting the resource configuration further comprises:
transmitting an information element comprising a list of activated cells to be updated, wherein the list of activated cells comprises the first cell, and wherein each cell within the list of activated cells comprises a respective cell resource configuration.

23. The method of claim 18, further comprising:
transmitting a child resource configuration for a child node of the IAB node, wherein the child resource configuration comprises a first child DU resource configuration for the first spectrum band and a second child DU resource configuration for the second spectrum band.

24. The method of claim 23, wherein the transmitting the child resource configuration for the child node further comprises:
transmitting a plurality of child DU resource configurations comprising the child resource configuration, each of the plurality of child DU resource configurations being associated with a different respective child node of the IAB node or a different respective cell associated with the child node.

25. The method of claim 18, wherein the transmitting the resource configuration further comprises:
transmitting an F1-Application Protocol (F1-AP) message comprising the resource configuration from a central unit (CU) of the IAB donor node to the IAB node.

26. An integrated access backhaul (IAB) donor node configured for wireless communication, comprising:
a transceiver;
a memory; and
a processor coupled to the transceiver and the memory, wherein the processor and the memory are configured to:
generate a resource configuration for a distributed unit (DU) of an IAB node within the IAB network, the resource configuration comprising a first DU resource configuration for a first spectrum band of paired spectrum and a second DU resource configuration for a second spectrum band of the paired spectrum, wherein the first DU resource configuration comprises an uplink symbol pattern for each of a plurality of uplink slots and the second DU resource configuration comprises a downlink symbol pattern for each of a plurality of downlink slots; and
transmit the resource configuration to the DU of the IAB node via the transceiver.

27. The IAB donor node of claim 26, wherein:
the uplink symbol pattern comprises a respective first symbol type for each of a plurality of first symbols in the uplink slot, wherein the respective first symbol type comprises an uplink symbol type or a flexible symbol type, and
the downlink symbol pattern comprises a respective second symbol type for each of a plurality of second symbols in the downlink slot, wherein the respective second symbol type comprises a downlink symbol type or the flexible symbol type.

28. The IAB donor node of claim 27, wherein the uplink DU resource configuration further comprises a respective first availability attribute for each of the first symbol types in the uplink slot and the downlink DU resource configuration further comprises a respective second availability attribute for each of the second symbol types in the downlink slot, wherein each of the respective first availability attributes and each of the respective second availability attributes comprise one of a hard symbol attribute, a soft symbol attribute, or a not available symbol attribute.

* * * * *